US012812703B2

(12) United States Patent
Starsinic et al.

(10) Patent No.: US 12,812,703 B2
(45) Date of Patent: Nov. 24, 2026

(54) METHODS, ARCHITECTURES, APPARATUSES AND SYSTEMS FOR OFFLOADING DATA TRAFFIC FLOWS FROM AN EDGE NETWORK OF A CELLULAR NETWORK TO A NON-CELLULAR NETWORK

(71) Applicant: InterDigital Patent Holdings, Inc., Wilmington, DE (US)

(72) Inventors: Michael Starsinic, Newtown, PA (US); Michel Roy, Candiac (CA); Taimoor Abbas, Sainte-Julie (CA); Robert Gazda, Spring City, PA (US); Kevin Di Lallo, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 229 days.

(21) Appl. No.: 18/833,158

(22) PCT Filed: Jan. 27, 2023

(86) PCT No.: PCT/US2023/011706
§ 371 (c)(1),
(2) Date: Jul. 25, 2024

(87) PCT Pub. No.: WO2023/147026
PCT Pub. Date: Aug. 3, 2023

(65) Prior Publication Data
US 2025/0113395 A1 Apr. 3, 2025

Related U.S. Application Data

(60) Provisional application No. 63/303,602, filed on Jan. 27, 2022.

(51) Int. Cl.
*H04W 76/12* (2018.01)
*H04W 28/08* (2023.01)
(Continued)

(52) U.S. Cl.
CPC ....... *H04W 76/12* (2018.02); *H04W 28/0865* (2023.05); *H04W 28/0925* (2020.05); *H04W 88/06* (2013.01)

(58) Field of Classification Search
CPC ..... H04W 48/18; H04W 60/04; H04W 48/16; H04W 84/042; H04W 60/00; H04W 4/50;
(Continued)

(56) References Cited

U.S. PATENT DOCUMENTS

2022/0272520 A1* 8/2022 Cakulev ................ H04W 8/183
2022/0312297 A1* 9/2022 Cakulev ................ H04M 15/62

FOREIGN PATENT DOCUMENTS

WO 2020232404 A1 11/2020
WO WO 2021138069 A1 7/2021

OTHER PUBLICATIONS

3rd Generation Partnership Project; Technical Specification Group Core Network and Terminals; Non-Access-Stratum (NAS) protocol for 5G System (5GS); Stage 3; (Release 17), 3GPP TS 24.501 V17.5.0, Dec. 2021, 916 pages.

(Continued)

*Primary Examiner* — Olumide Ajibade Akonai
(74) *Attorney, Agent, or Firm* — Volpe Koenig

(57) ABSTRACT

Procedures, methods, architectures, apparatuses, systems, devices, and computer program products for offloading data traffic flows, received by a wireless transmit-receive unit (WTRU) via an edge network of a cellular network or transmitted by the WTRU via the edge network of the cellular network, to a non-cellular network. A WTRU may determine that a data traffic flow received-transmitted by the (Continued)

WTRU transits via the edge network and take appropriate actions.

16 Claims, 14 Drawing Sheets

(51) Int. Cl.
*H04W 28/086* (2023.01)
*H04W 88/06* (2009.01)

(58) Field of Classification Search
CPC ....... H04W 8/18; H04W 36/08; H04W 76/10; H04W 76/15; H04W 24/02; H04W 24/04; H04W 36/144; H04W 48/06; H04W 28/02; H04W 36/22; H04L 41/0816; H04L 67/14; H04M 15/8228; H04M 15/8038
See application file for complete search history.

(56) References Cited

OTHER PUBLICATIONS

Pencheva et al., "Third Party Initiated WLAN Offloading", IX National Conference With International Participation "Electronica 2018", IEEE, May 17, 2018, 4 pages.

Draves et al., "Default Router Preferences and More-Specific Routes", Internet Engineering Task Force (IETF), Request for Comments: 4191 Version 07, Nov. 2005, 15 pages.

3rd Generation Partnership Project; Technical Specification Group Services and System Aspects; Architecture for enabling Edge Applications; (Release 17); 3GPP TS 23.558 V17.2.0, Dec. 2021, 163 pages.

3rd Generation Partnership Project; Technical Specification Group Services and System Aspects; 5G System Enhancements for Edge Computing; Stage 2 (Release 17), 3GPP TS 23.548 V17.1.0, Dec. 2021, 55 pages.

Apple, "KI#6: New Solution: Network guided EC traffic switching", 3GPP TDOC S2-2205216, 3GPP SA WG2 Meeting #151e, Electronic meeting, May 16, 2022, 5 pages.

3rd Generation Partnership Project; Technical Specification Group Services and System Aspects; System architecture for the 5G System (5GS); Stage 2, (Release 17), 3GPP TS 23.501 V17.3.0, Dec. 2021, 559 pages.

3rd Generation Partnership Project; Technical Specification Group Core Network and Terminals; User Equipment (UE) policies for 5G System (5GS); Stage 3 (Release 17), 3GPP TS 24.526 V17.5.0, Dec. 2021, 54 pages.

3rd Generation Partnership Project; Technical Specification Group Services and System Aspects; Policy and charging control framework for the 5G System (5GS); Stage 2 (Release 17), 3GPP TS 23.503 V17.3.0, Dec. 2021, 144 pages.

* cited by examiner

METHODS, ARCHITECTURES, APPARATUSES AND SYSTEMS FOR OFFLOADING DATA TRAFFIC FLOWS FROM AN EDGE NETWORK OF A CELLULAR NETWORK TO A NON-CELLULAR NETWORK

CROSS-REFERENCE TO RELATED APPLICATIONS

This application is a U.S. National Stage Application under 35 U.S.C. § 371 of International Patent Application No. PCT/US2023/011706, filed 27 Jan. 2023, which claims the benefit of U.S. Provisional Patent Application No. 63/303,602 filed 27 Jan. 2022, which is incorporated herein by reference.

BACKGROUND

The present disclosure is generally directed to the fields of communications, software and encoding, including, for example, to methods, architectures, apparatuses, systems directed to offloading traffic that is associated with edge services and provided to User Equipment to a wireless local network.

SUMMARY

A User Equipment (UE) or Wireless Transmit-Receive Unit (WTRU) may be equipped with a Wireless Local Area Network (WLAN), e.g., WiFi, radio that allows the WTRU to obtain connectivity to data networks without utilizing the 5G System. However, when a WLAN (e.g., WiFi) network becomes available and the WTRU chooses to stop using the 5G System for data network connectivity, it cannot be assumed that the WTRU will be able to continue to access the same edge data network(s) that was (were) available via the 5G system. Thus, when the WTRU moves to a location where it prefers to use the WLAN (e.g., WiFi) to access data networks without traversing the 5G system, the WTRU will lose access to any Edge Services that the WTRU was accessing via the 5G system. Improvement is therefore desired.

According to one aspect of the present disclosure, there are provided methods, implemented by a WTRU having a WLAN radio access technology (RAT) transceiver and a cellular network RAT transceiver, according to the described embodiments and appended claims.

According to a further aspect of the present disclosure, embodiments of WTRU having a WLAN radio access technology (RAT) transceiver and a cellular network RAT transceiver, are described and are claimed in the appended claims.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
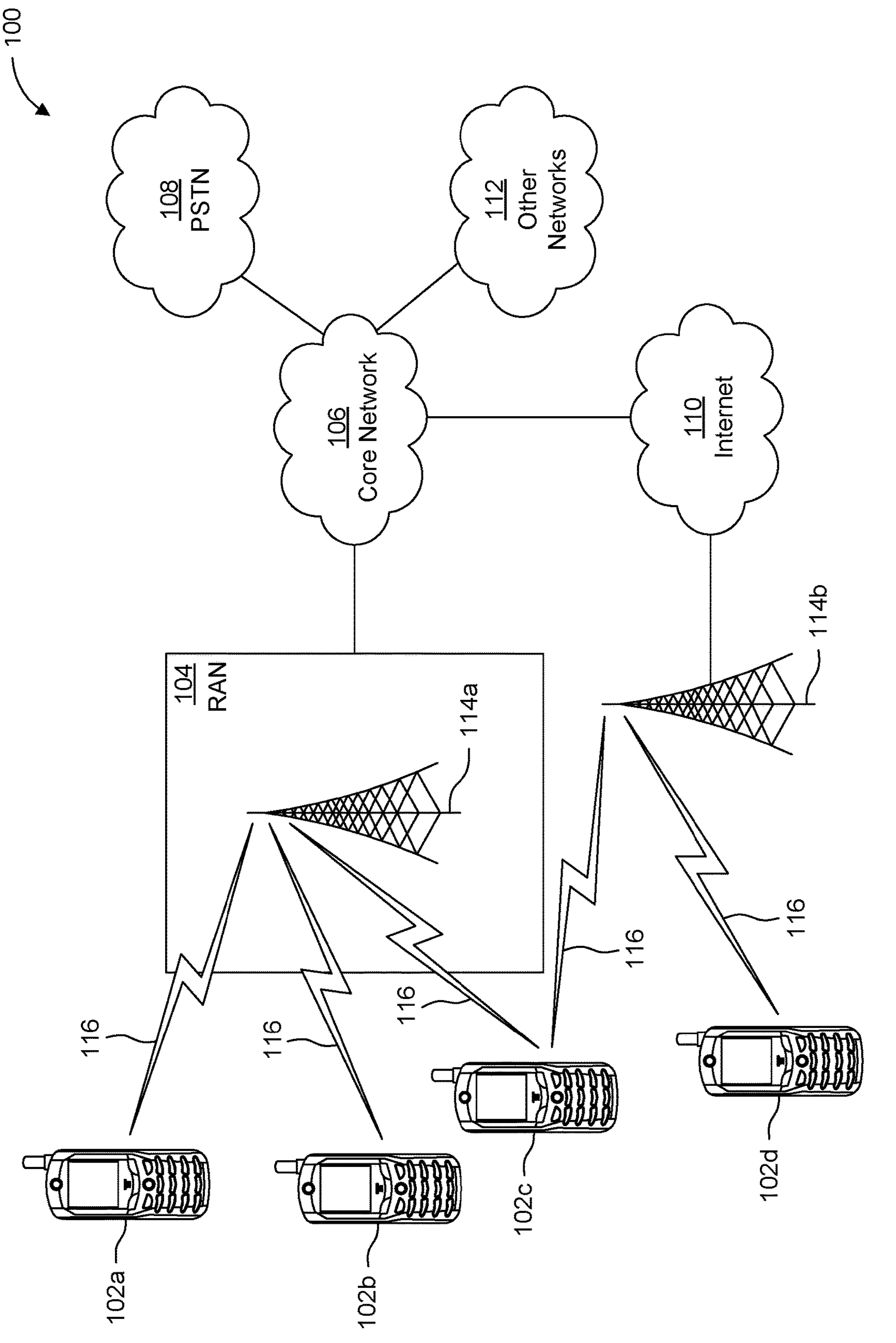
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
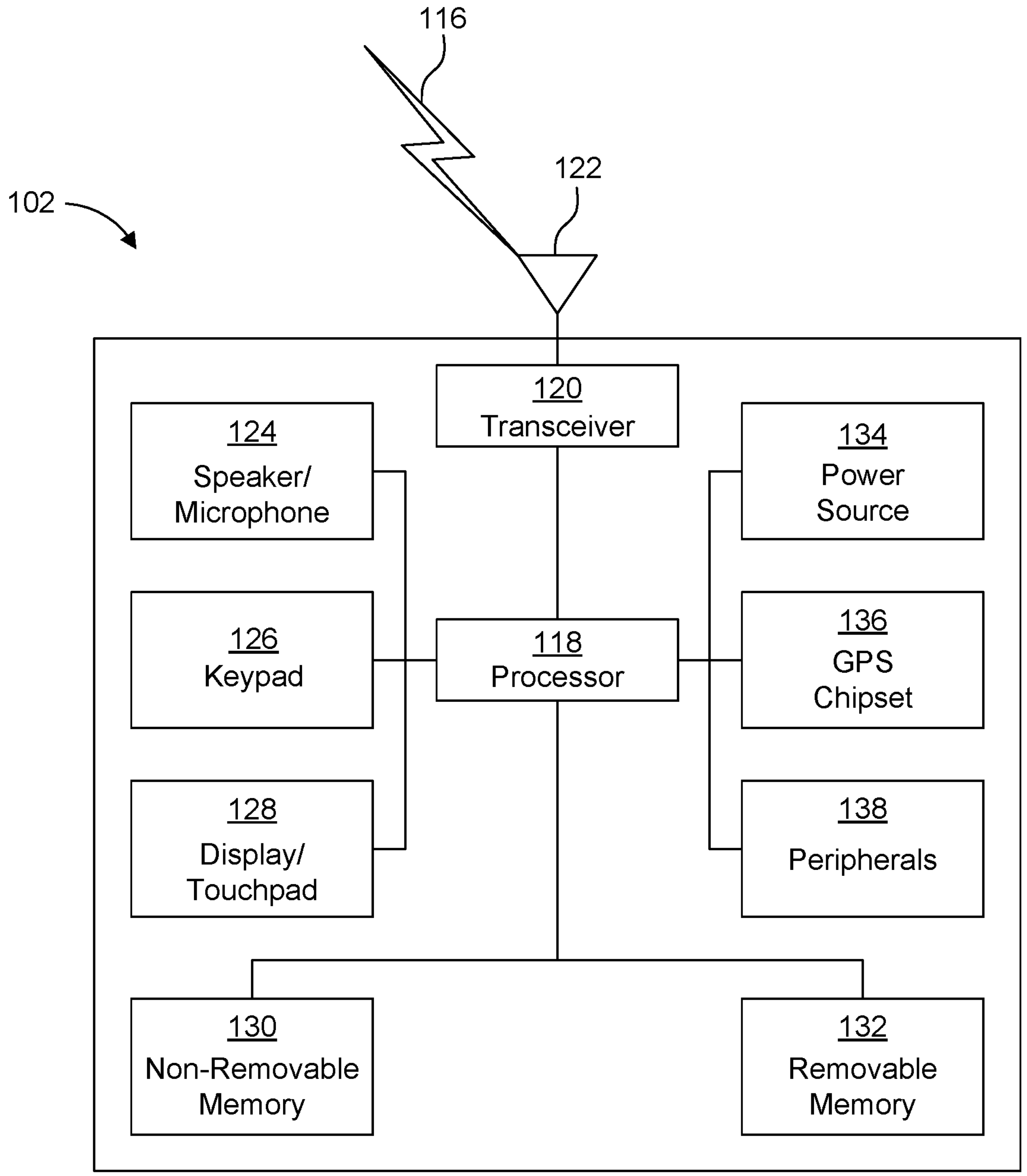
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
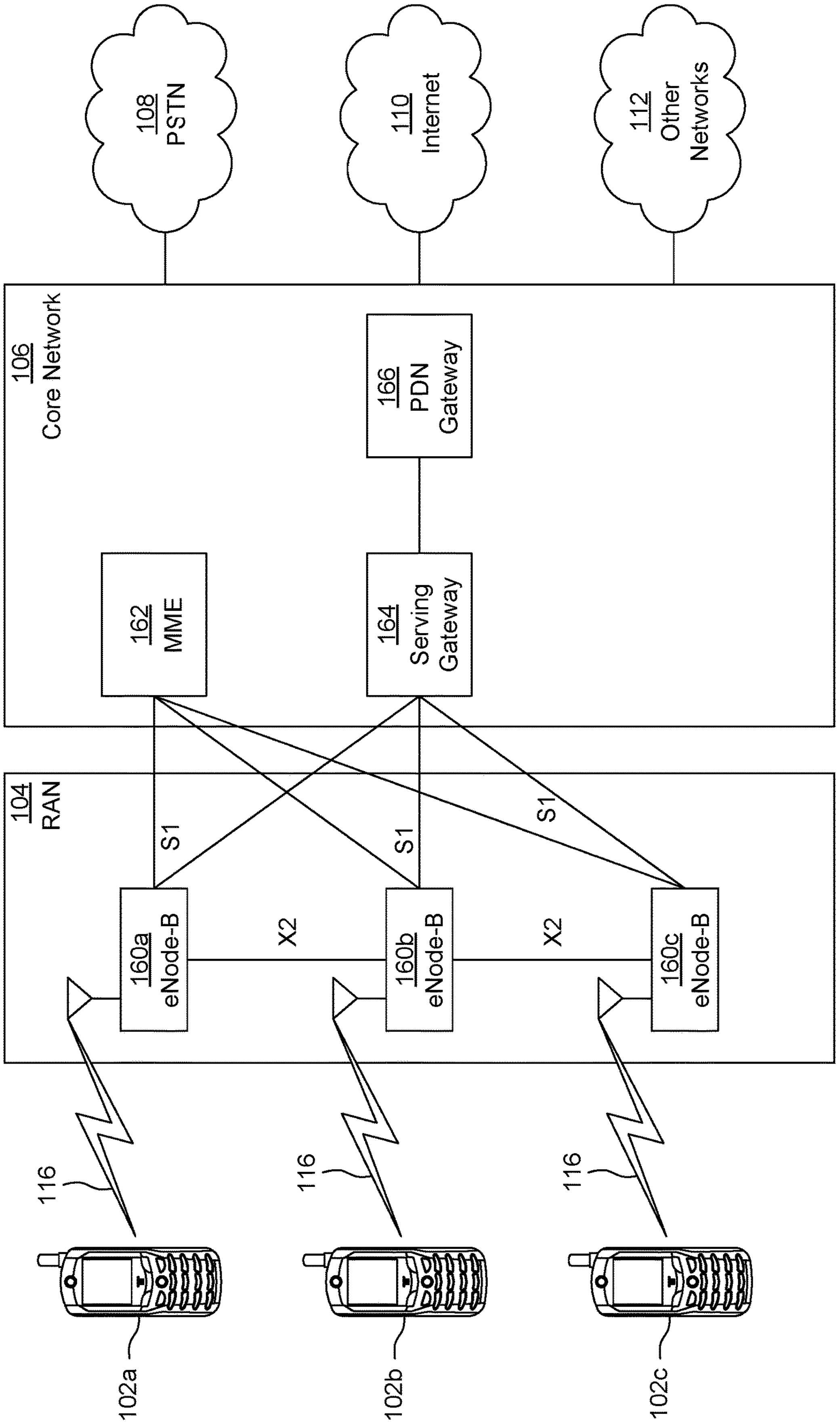
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the SI interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHZ, and/or 160 MHz wide channels. The 40 MHz, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHZ, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
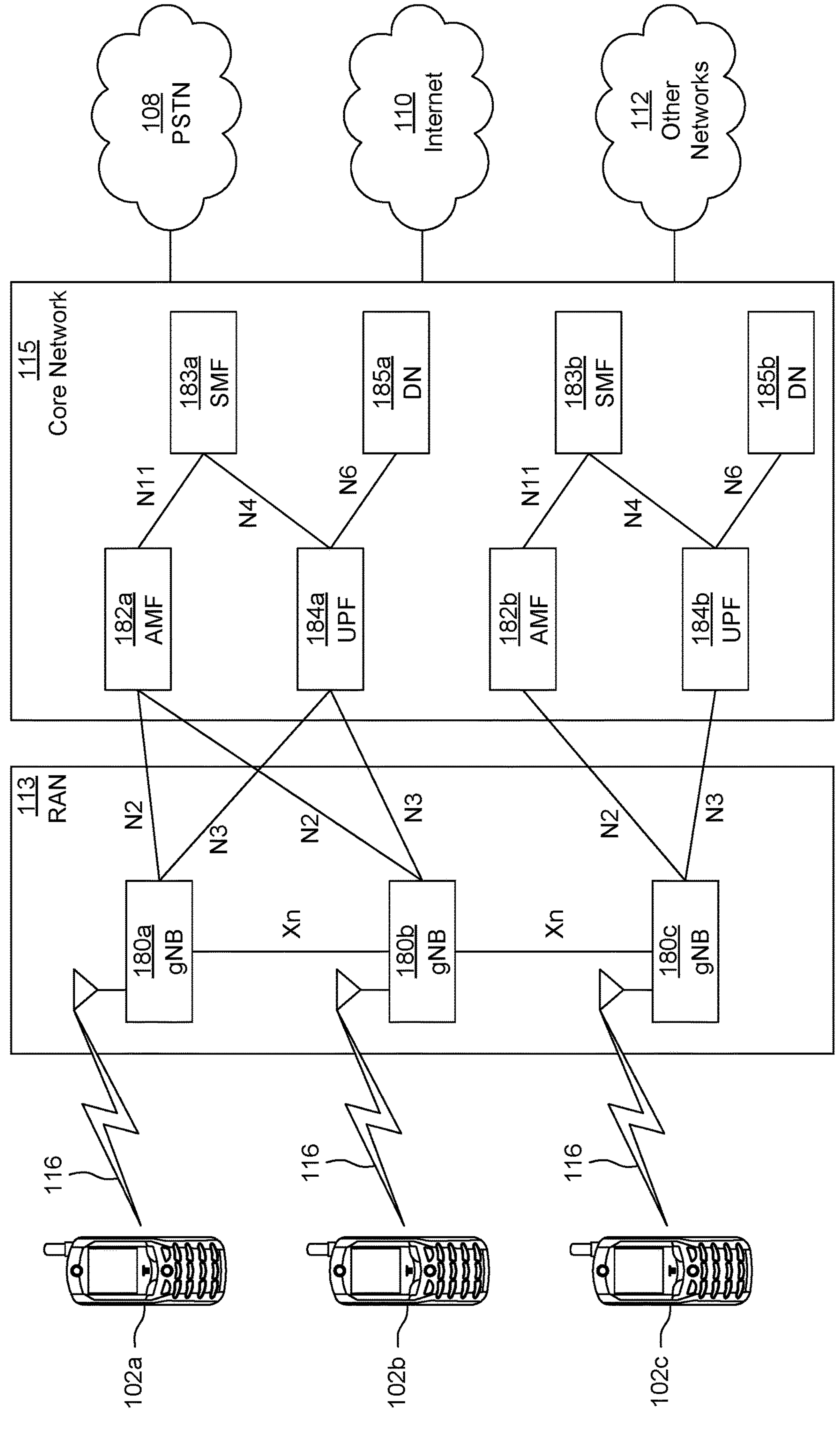
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

The following lists some of the acronyms used in this document.

AC—Application Client
AMF—Access and Mobility Function
AN—Access Network
API—Application Programing Interface
AT—Attention
DN—Data Network
DNN—Data Network Name
EAS—Edge Application Server
ECS—Edge Configuration Server
EDN—Edge Data Network
EEC—Edge Enabler Client
EES—Edge Enabler Server
ePDG—Evolved Packet Data Gateway
FQDN—Fully Qualified Domain Name
GUI—Graphical User Interface
IP—Internet Protocol
LADN—Local Area Data Network
MT—Mobile Termination
NAS—Non-Access Stratum
NAS-MM-NAS—Mobility Management
NAS-SM-NAS—Session Management
NSSAI—Network Slice Selection Assistance Information
N3IWF—Non-3GPP Interworking Function
PCF—Policy Control Function
PDU—Protocol Data Unit
PLMN—Public Land Mobile Network
PSA—PDU Session Anchor
RAT—Radio Access Technology
RSD—Route Selection Descriptor
SMF—Session Management Function
SSC—Session and Service Continuity
SSID—Service Set Identifier
S-NSSAI—Single NSSAI
TE—Terminal Equipment
UE—User Equipment
UL CL—Uplink Classifier
UPF—User Plane Function
URSP—UE (WTRU) Route Selection Policy
WLAN—Wireless Local Area Network While the present is most often described with examples relating to the fifth generation technology standard for broadband cellular networks (5G), the present principles are not limited to 5G, and may be applicable to 6G technology, or other future generation technology standard for broadband cellular networks, further indicated as 'xG'.

In the context of what follows, "accessing" or "using" or "utilizing" edge computing resources refers to the WTRU sending and receiving IP packets to and from an Application Server that resides in an Edge Network.

In the context of what follows, an Edge Network may be any data network (e.g. a packet data network). However, an edge data network is often a data network that is geographically closer to the WTRU than some larger data network such as the internet.

In the context of what follows, Application Traffic refers to data packets (i.e. IP packets) that are sent to and from an application that is hosted in a WTRU.

In this document, the term Wireless Local Area Network (WLAN) is used. Non-limiting examples of WLANs are a Wi-Fi network, a WiMax network, and a Bluetooth network. The WLAN may be further referred to as a 'non-cellular network' in the context of this document.

This document discusses how a WTRU communicates with an AMF. Communication between a WTRU and AMF is carried out on the N1 interface using the NAS protocol.

This document discusses how a WTRU communicates with an SMF. Communication between a WTRU and SMF is carried out via NAS signaling (i.e., communication between the WTRU and SMF is via the AMF on the N1 interface). The communication protocol between the UE and SMF is referred to as NAS-SM.

In the context of what follows, the wording "non-seamless (WLAN) offload" is used to indicate a connectivity change resulting in removing at least some data traffic between a WTRU and a data network (for example the Internet) from the edge network that provides connectivity of the WTRU to the data network, and replacing, for the at least some data traffic, the connectivity of the WTRU to the data network via the edge network by a connection to the data network via a WLAN. The term "offload(ing)" indicates the use of complementary network technologies (such as WLAN) for exchanging data with a data network that originally used the cellular network and was "offloaded" to a different network (such as a WLAN). Instead of 'offload', the term 'handover' may also be used. Advantages of offloading includes reduction of the amount of data being carried on the cellular bands, freeing bandwidth for other use/users, and improvement of connectivity in (geographic) locations (e.g., indoor, or at an outdoor location, where cellular network coverage is poor. The term "non-seamless" is used in this context to indicate that the connectivity change causes an interruption, for the at least some data traffic, due to the connectivity change; for example, a data/streaming session may be interrupted. While a seamless handover would cause no noticeable impact on user experience, a "non-seamless" offload/handover would cause a noticeable impact on user experience. For example, a "non-seamless" offload/handover may cause the WTRU to completely lose connectivity to a service or may cause the WTRU to temporarily disconnect and reconnect to a service via a new (i.e. WLAN) network connection. Non-seamless WLAN offload is achieved by acquiring a local IP address on WLAN by the WTRU, particular IP flows are routed via the WLAN without passing through the 3GPP core network and no IP address preservation in the core network is provided between WLAN and 3GPP accesses for mobility.

In the context of what follows, the wording "non-seamless offload is/becomes available/possible" is used to indicate that a WTRU is/becomes in wireless coverage range of a WLAN and has established/may establish access to a Wi-Fi network that provides access to the data network (e.g., the Internet) without using the 5G System.

Session and Service Continuity (SSC) Modes

Data session continuity and session continuity is key to ensure uninterrupted user experience irrespective of any change of WTRU IP address or change in core network anchor point. For example, a continuity of an IP session may be maintained by keeping the WTRUs PDU session IP address (session address) (see further on) regardless of the WTRU's mobility.

In the 5G system architecture, Session and Service Continuity (SSC) support enables to address the various continuity requirements for different applications and services for the WTRU. However, not all applications require guaranteed IP session continuity even if service continuity is needed. A 5G system offers different types of session continuity depending on WTRU or service type. The 5G System uses the PDU Session framework (session framework) to carry application traffic. Application traffic has varying requirements in terms of how application layer sessions and services maintain continuity (i.e., seamless) when events such as change of IP Address and WTRU mobility occur.

Each PDU Session in the 5G System is associated with one of three SSC Modes. A 5G system allows a service provider to set a specific SSC mode for a given PDU Session. Some features related to SSC modes:

- SSC modes determine the flow of packets across network in mobility scenarios;
- A PDU Session is configured to use a specific 'Session and Service Continuity' (SSC) mode;
- 3GPP specifications provide three different types of SSC modes;
- A WTRU can request a specific mode using the 'SSC Mode' field within the NAS using a PDU Session Establishment Request;
- The SMF specifies the allocated mode using the 'Selected SSC Mode' field within the NAS using a PDU Session Establishment Accept;
- SSC Mode 1 & 2 can work for PDU Type as IP and Ethernet whereas SSC Mode 3 can only work with PDU session type IP.

Figure 2:
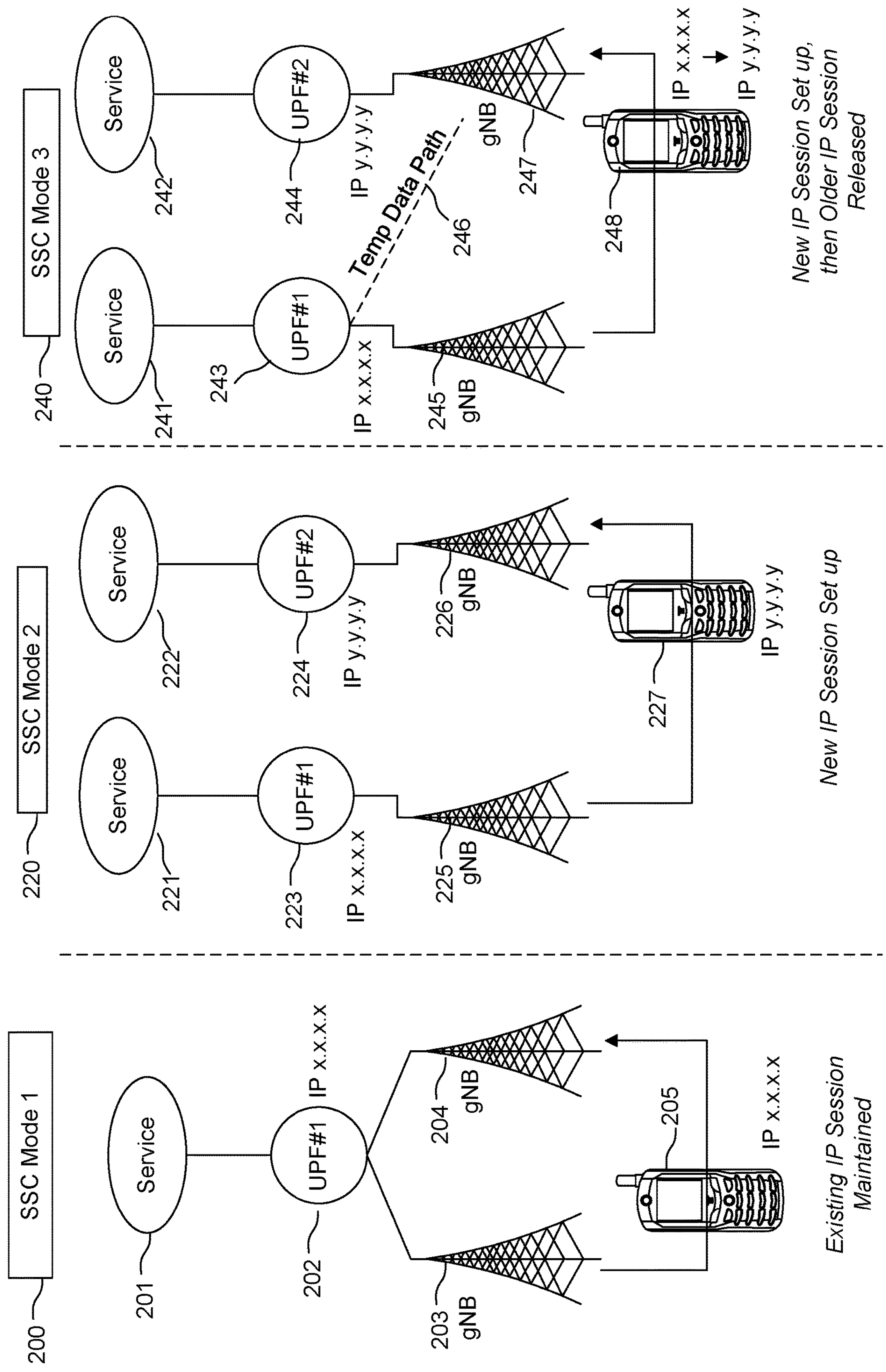
FIG. 2 shows different SSC modes in a 5G system.

The different SSC modes in a 5G system are illustrated with the help of FIG. 2. The figure shows a diagram for SSC Mode 1 (200) having one UPF (202) for a service (201) and two gNBs (203, 204) and a WTRU (205); a diagram for SSC Mode 2 (220) having two UPFs (223, 224) each for a different service (221, 222), and two network nodes (gNBs) (225, 226) and a WTRU (227); and a diagram for SSC Mode 3 (240). For SSC modes, there are two network nodes (gNB) having two UPFs (243, 244) each for a different service (241, 242), and two network nodes (gNBs) (245, 247), a WTRU (248) and a temporary data path (246) between UPF #1 (243) and gNB (247).

For a PDU Session of SSC mode 1 (200), the UPF (202) acting as PDU Session Anchor at the establishment of the PDU Session for a service (201) is maintained regardless of WTRU (205) mobility. For the PDU session Type as IPv4 or IPV6 or IPv4v6 type, the IP address is preserved. In this case the User Plane function (UPF) acting as the PDU session anchor is maintained (remains the same) until the WTRU (205) releases the PDU session.

For a PDU Session of SSC mode 2 (220), if the PDU Session has a single PDU Session Anchor, the network may trigger the release of the PDU Session and instruct the WTRU to establish a new PDU Session to the same data network immediately. The trigger condition depends on operator policy e.g. request from Application Function, based on load status, etc. At establishment of the new PDU Session, a new UPF (224) acting as PDU Session Anchor can be selected. A use case for this is that a network may release connectivity if there is a requirement for load balancing at the anchor UPF. Here, the PDU Session may be moved onto a different anchor UPF by releasing the existing PDU Session and subsequently establishing a new PDU Session.

For PDU Session of SSC mode 3 (240), the network allows the establishment of WTRU (248) connectivity via a new PDU Session Anchor to the same data network before connectivity between the WTRU and the previous PDU Session Anchor is released. This is illustrated by the broken line (246) between gNB (247) and UPF #1 (243). The network preserves the connectivity provided to the WTRU (248) but there may be some impact during certain procedures. For example, the IP address allocated to the WTRU (248) will be updated if the Anchor UPF changes but the change procedure will ensure that connectivity is preserved, i.e. connectivity towards the new Anchor UPF (244) is established before releasing the connection to the old Anchor UPF (243).

UE (WTRU) Route Selection Policy (URSP)

A UE (WTRU) Route Selection Policy (URSP) rule is a policy that is used by the WTRU to determine how to route outgoing traffic. Traffic can be routed to an established PDU Session, can be offloaded to non-3GPP access outside a PDU Session, can be routed via a ProSe Layer-3 WTRU-to-Network Relay outside a PDU session, or can trigger the establishment of a new PDU Session.

Note that a WTRU Application may request a network connection using Non-Seamless Offload or ProSe Layer-3 WTRU-to-Network Relay Offload. In such a scenario, the WTRU will use Non-Seamless Offload for this application without evaluating the URSP rules. Otherwise, the WTRU will use URSP rules to determine how to route the application traffic.

Each URSP rule consists of 2 parts. The first part of the URSP rule is a Traffic descriptor that is used to determine when the rule is applicable. A URSP rule is determined to be applicable when every component in the Traffic descriptor matches the corresponding information from the application. The second part of the URSP rule is a list of Route Selection Descriptors (RSD). The list of Route Selection Descriptors contains one or more Route Selection Descriptors. The RSDs are listed in priority order and describe the characteristics of a PDU Session that may be used to carry the uplink application data. Characteristics of a PDU Session include SSC Mode, DNN, and S-NSSAI. The RSD may alternatively include a Non-Seamless Offload indication that indicates that the traffic may be sent via non-3GPP access (i.e. WiFi) and outside of any PDU Session.

For every newly detected application the WTRU evaluates the URSP rules in the order of Rule Precedence and determines if the application matches the Traffic descriptor of any URSP rule. When a URSP rule is determined to be applicable for a given application, the WTRU will select a Route Selection Descriptor within this URSP rule in the order of the Route Selection Descriptor Precedence.

When a valid Route Selection Descriptor is found, the WTRU determines if there is an existing PDU Session that matches all components in the selected Route Selection Descriptor. When a matching PDU Session exists, the WTRU associates the application to the existing PDU Session, i.e. the WTRU routes the traffic of the detected application on this PDU Session. If none of the existing PDU Sessions matches the RSD, the WTRU tries to establish a new PDU Session using the values specified by the selected Route Selection Descriptor.

Once traffic from an application is associated with a PDU Session, an event may cause the WTRU to re-evaluate the URSP rules and associate the traffic from the application with a different PDU Session. Two examples of events that may trigger URSP re-evaluation are an implementation dependent re-evaluation timer and the WTRU establishing access to a WLAN network that provides internet access without using the 5G System (i.e., Non-Seamless Offload becomes possible).

A Traffic Descriptor may be an Application Descriptor, an IP descriptor, a Domain Descriptor, a non-IP descriptor, a DNN, or connection capabilities. An IP descriptor may be a Destination IP 3 tuple(s) (i.e. an IP address or IPv6 network prefix, port number, protocol ID of the protocol above IP).

WLAN Connectivity

Different types of radio access technologies (RATs) may be used to access a 5G System and obtain connectivity to a data network such as the internet or an edge data network. NR and WiFi are two types of RATs that may be used to access the 5G System and obtain connectivity to a data network such as the internet or an edge data network.

A WTRU may be equipped with a WLAN (e.g., WiFi, WiMax, Bluetooth) radio that may be used to obtain connectivity to a data network such as the internet or an edge data network without using the 5G System. A common example of such a connection occurs when a smart phone discovers a WiFi SSID, connects to the network that is identified by the SSID, and obtains an internet connection that does not traverse the 5G system. This type of network connection may commonly be called "non-seamless offload", or "non-seamless WLAN offload". This type of network connection change is often called "non-seamless offload" because when data flows are moved ("offloaded") from the cellular network to a non-cellular network (i.e. to a WLAN), the data session anchors (e.g. the UPFs) must change and, often, the WTRU will not even be able to automatically connect to the same data network. Since IP Addresses and Data Network connectivity cannot be maintained, the user will experience some level of service interruption (e.g., the user may need to renew the connections to the data network via the connection to the non-cellular network). Thus, the movement of the data from one network to another does not appear to be seamless to the user.

Connectivity Models in the 5G System

An NR system, such as the 5G system, supports multiple connectivity models to enable the WTRU access edge computing resources.

Figure 4:
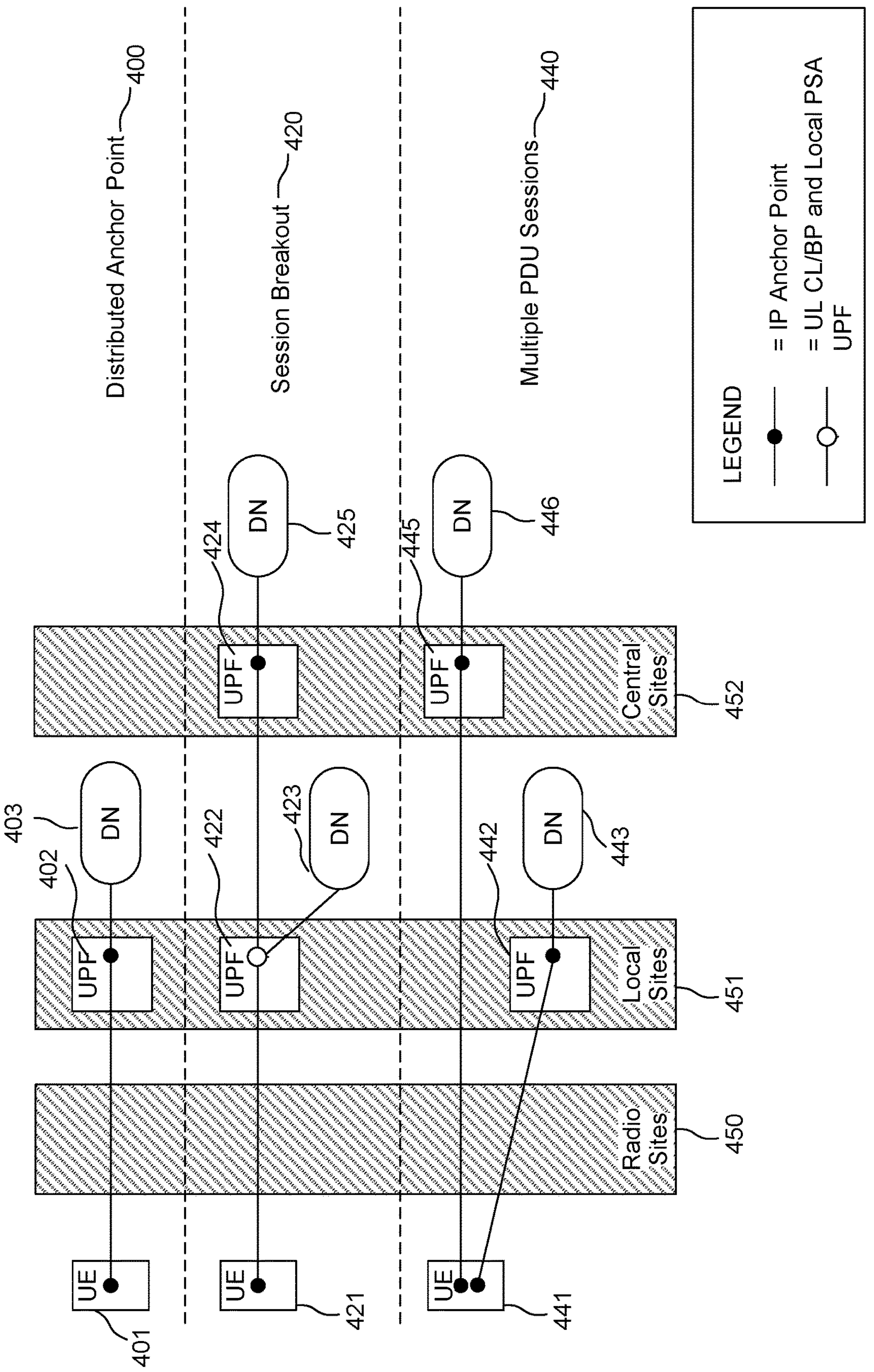
FIG. 4 is an overview of 5GC connectivity models for edge computing.

The three connectivity models for accessing edge computing resources are described in the following and are illustrated in FIG. 4. Illustrated are WTRUs (401, 421, 441), UPFs (402, 422, 442, 424, 445), Data Networks (403, 423, 443, 425, 446), Radio Sites (450), Local Sites (451) and Central Sites (452).

One connectivity option for accessing edge computing resources is called "Distributed Anchor Point" (400). When this option is used, the PSA UPF (402) is located in the edge network (451) (i.e. close to the WTRU's location). The PDU Session that is used to carry to traffic to/from the PSA UPF may use SSC Mode 2 or SSC Mode 3. Thus, when the WTRU's location changes, the PSA UPF may change. The procedure for changing the PSA UPF is determined based on whether SSC Mode 2 or SSC Mode 3 is used.

Figure 3:
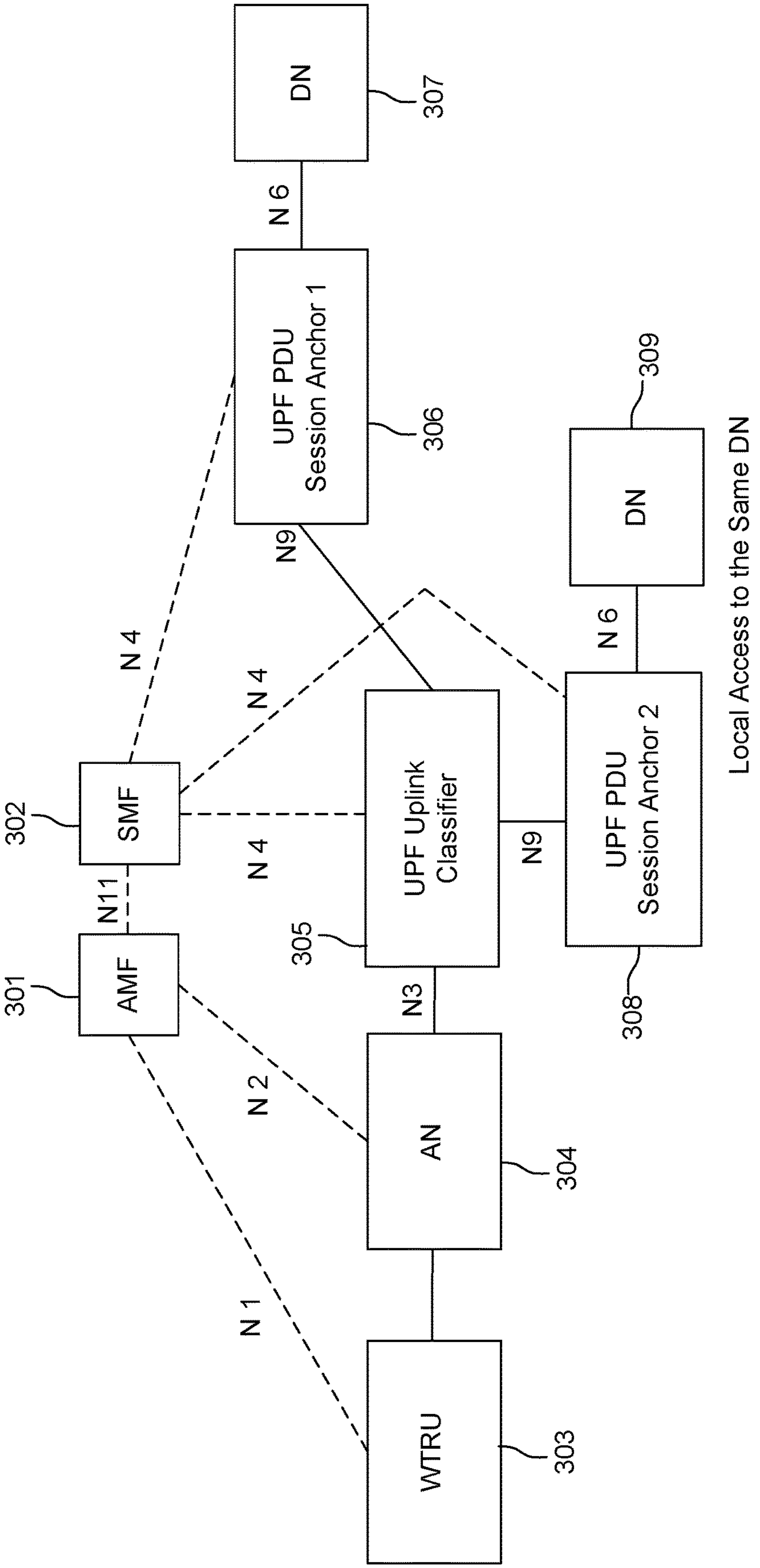
FIG. 3 is a user plane architecture for an uplink classifier.

A second connectivity option is referred to as "Session Breakout" (420). When this option is used, the PDU Session that is used to carry to traffic to/from edge network may be associated with 2 PSA UPFs. A first PSA UPF (424) may be called a C-PSA and may be located in a central site (452). The central site is not necessarily geographically close to the WTRU. The second PSA UPF (422) may be called an L-PSA and be located in a local network (451). The local network would typically be located geographically close to the WTRU (421). This connectivity model is illustrated in FIG. 3. The figure illustrates an AMF (301), an SMF (302), a WTRU (303), an Access Network (304), an UPF Uplink Classifier (305), an UPF PDU Session Anchor 1 (306), a first Data Network (307), an UPF PDU Session Anchor 2 (308) and a second Data Network (309). Whether to insert or remove an UL CL in a PDU Session is determined by the SMF and controlled by the SMF. The SMF may decide to insert, in the data path of a PDU Session, a UPF supporting the UL CL functionality during or after the PDU Session Establishment, or, to remove from the data path of a PDU Session, a UPF supporting the UL CL functionality after the PDU Session Establishment. In the 5G System, the SMF does not notify the WTRU if an UL CL UPF is added or removed from the PDU Session.

A third connectivity option is referred to as "multiple PDU Sessions" (440). When this option is used, the WTRU (441) uses a PDU Session to access edge computing resources in an edge network (451). In other words, the PSA UPF(s) (442) of the PDU Session are in the edge network. When the WTRU moves, SSC Mode 3 may be used to change the PSA UPF of this edge network PDU Session. When this option is used, the WTRU uses other PDU Session(s) to access resources that are not in the edge data network. The PSA UPF(s) (445) of these other PDU Session(s) are not in the edge network and are not typically geographically close to the WTRU.

URSP rules may be used to configure the WTRU to use any of the connectivity options that are described above. URSP rules are required in order to use the "multiple PDU Sessions" connectivity model.

IPv6 Multi-Homing for a PDU Session in the 5G System

A multi-homed PDU Session may also provide access to a Data Network via more than one PDU Session Anchor. The different user plane paths leading to the different PDU Session Anchors branch out at a "common" UPF referred to as a UPF supporting "Branching Point" functionality. The Branching Point provides forwarding of UL traffic towards the different PDU Session Anchors and merging of DL traffic to the WTRU (i.e., merging the traffic from the different PDU Session Anchors on the link towards the WTRU).

Whether to insert or remove a UPF supporting a Branching Point is determined by the SMF and controlled by the SMF. The SMF may decide to insert, in the data path of a PDU Session, a UPF supporting the Branching Point functionality during or after the PDU Session Establishment, or to remove, from the data path of a PDU Session, a UPF supporting the Branching Point functionality after the PDU Session Establishment.

Figure 5:
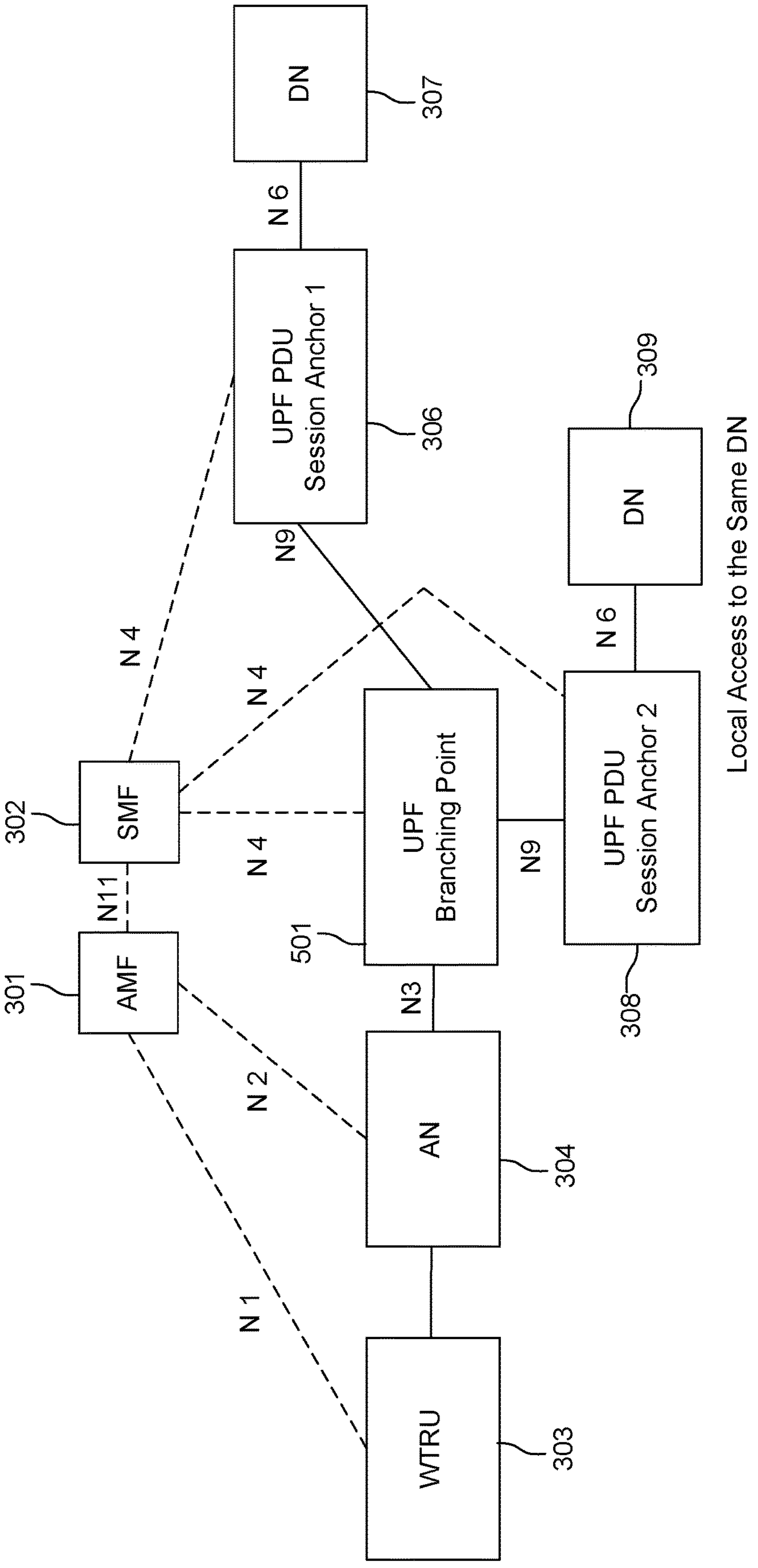
FIG. 5 is a multi-homed PDU session illustrating local access to a same DN.

The multi-homed PDU Session may be used to support cases where a WTRU needs to access both a local service (e.g., local server) and a central service (e.g. the internet), this is illustrated FIG. 5. The figure is like FIG. 3, except for the UPF Branching Point 501 that replaces the UPF Uplink Classifier 305 of FIG. 3.

When the SMF (302) removes or adds a branching point the SMF notifies the WTRU (303) of the updated IPv6 prefixes. The SMF sends IPv6 multi-homed routing rules to the WTRU to influence the source IPv6 prefix selection in IPv6 Router Advertisement (RA) messages. This message is sent via a UPF.

LADN Information

The 5G System is able to inform the WTRU about data networks that are available to the WTRU and information about the capabilities of the data network that are available to the WTRU. The "LADN Information" Information Element is a mechanism by which the network can send to the WTRU a DNN and the geographical area where the data network is available to the WTRU.

LADN Information (i.e. LADN Service Area Information and LADN DNN) is provided by AMF to the WTRU during the Registration procedure or WTRU Configuration Update procedure. For each LADN DNN configured in the AMF, the corresponding LADN Service Area Information includes a set of Tracking Areas that belong to the Registration Area that the AMF assigns to the WTRU (i.e. the intersection of the LADN service area and the assigned Registration Area).

LADN information may be sent to the WTRU by the AMF when the WTRU indicates to the AMF that it is able to receive LADN information in a Registration Request.

Application Layer Architecture for Enabling Edge Applications

Figure 6:
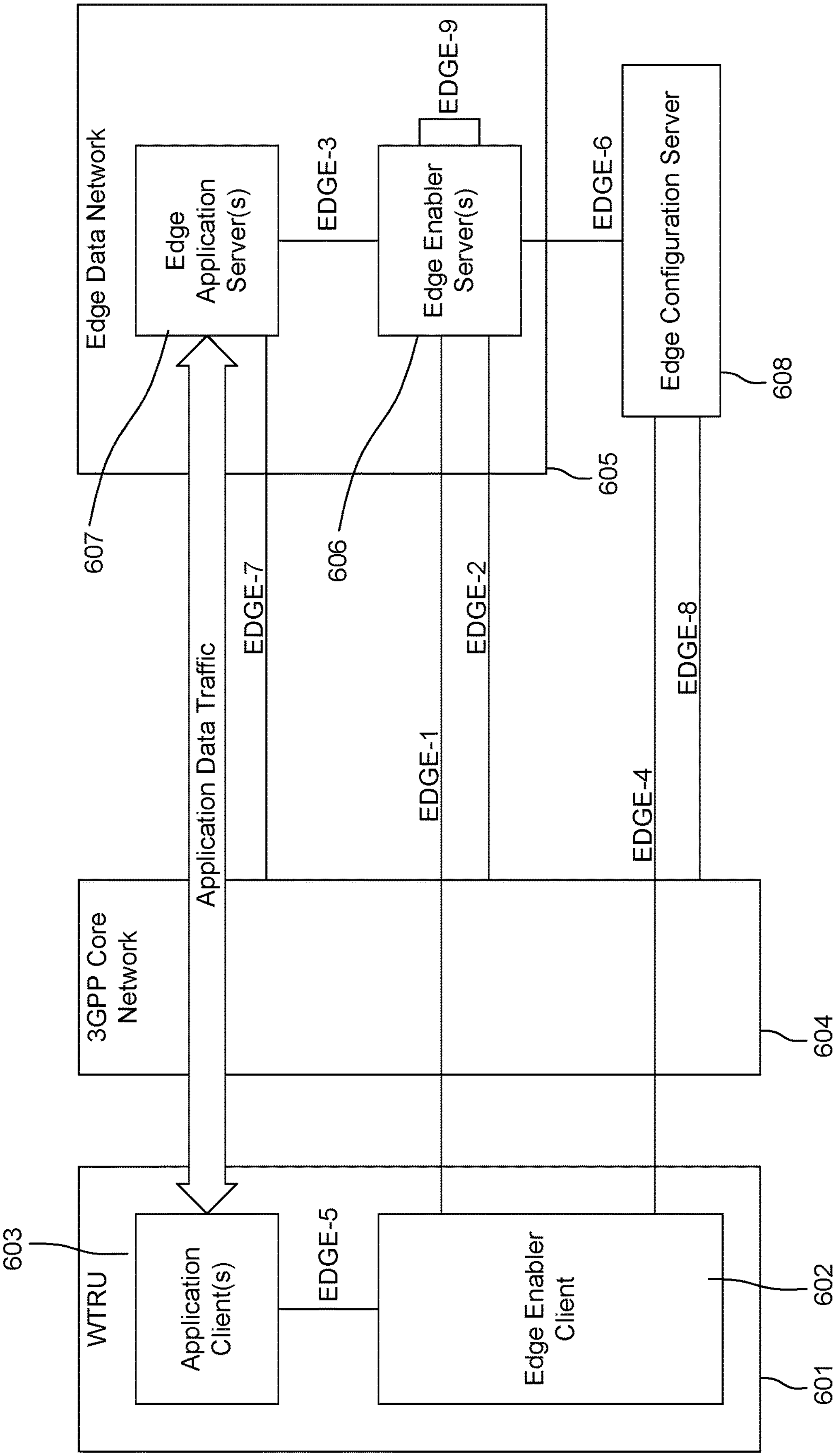
FIG. 6 is an architecture for enabling edge applications.

FIG. 6 illustrates an example architecture for edge applications. Shown are, from left to right, a WTRU (601), a (3GPP) Core Network (604), and an Edge Data Network (605).

The WTRU (601) may host an Edge Enabler Client (EEC) (602). The EEC is a type of application that provides services to other applications that are hosted on the WTRU and accesses services in an edge data network.

The WTRU may host an Application Client (AC) (603). An AC is a type of application that accesses services in an edge data network.

The EDGE-5 interface (line between EEC and AC) is an interface that is used to exchange information between the AC and EEC. The EDGE-5 interface may be an API based interface.

An Edge Application Server (EAS) (607) and an Edge Enabler Server (EES) (606) are types of servers that provide edge services to applications clients and EECs. EASs and EESs are typically deployed in an edge data network (605) that is geographically close to the WTRU.

An Edge Configuration Server (ECS) (608) is a type of server that sends configuration information to EECs. The configuration information includes information about EES(s) and EAS(s) that may be available for the EEC to access.

Overview

A common theme of the edge computing connectivity models described above is that they all rely on the 5G System to provide the WTRU with access to a PSA UPF that is in the edge network. It is also notable that all three connectivity models allow for the PSA UPF to change when the WTRU's location changes.

As described above, a WTRU may be equipped with a WLAN (e.g., WiFi) radio that allows the WTRU to obtain connectivity to data networks without utilizing the 5G System. However, when a WLAN (e.g., WiFi) network becomes available and the WTRU chooses to stop using the 5G System for data network connectivity, it cannot be assumed that the WTRU will be able to continue to access the same edge data network(s) that was (were) available via the 5G system. Thus, when the WTRU moves to a location where it prefers to use the WLAN (e.g., WiFi) to access data networks without traversing the 5G system, the WTRU will lose access to any Edge Services that the WTRU was accessing via the 5G system.

According to an embodiment, the 5G System is therefore enhanced so that the WTRU can determine which PDU Sessions, or what traffic is utilizing edge services.

According to a further embodiment, once the WTRU makes this determination, the WTRU may be able to either terminate its application layer connection to edge services in a way that allows the application to be warned of the impending termination or selectively use non-seamless offloading for some application layer traffic and not use non-seamless offloading for other application layer traffic.

Figure 7:
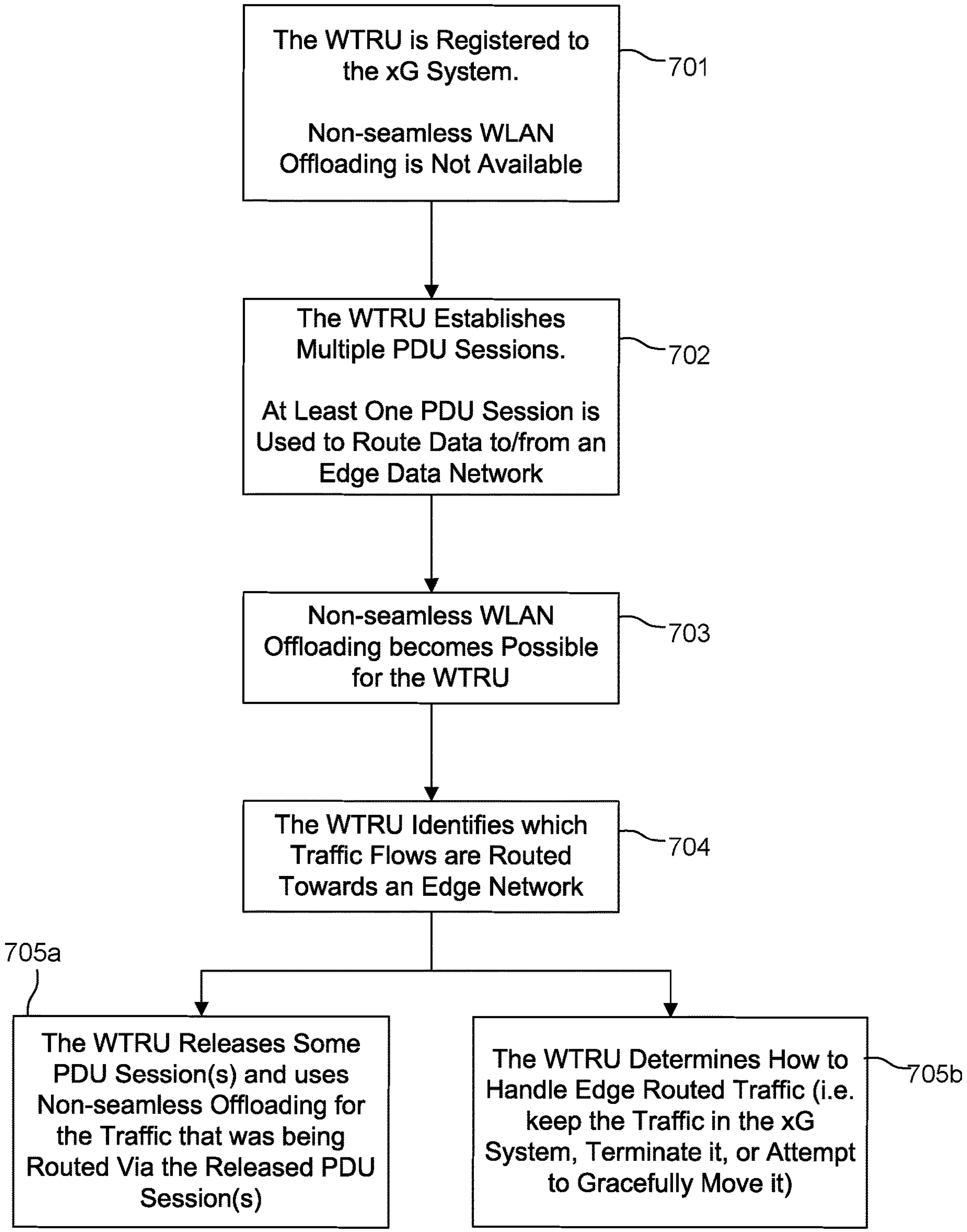
FIG. 7 shows WTRU handling of edge and non-edge traffic when non-seamless offloading becomes possible.

In the following, radio system (e.g., a 5, 6, or xG radio system) enhancements are described that enable a WTRU to determine what traffic is being routed to an edge data network. Furthermore, in the following is described what actions the WTRU may take when the edge data network becomes inaccessible to the WTRU over a preferred access network because the WTRU is using the Radio System to access edge data network(s) and the WTRU has determined that it is preferable for at least some of the WTRU's traffic to be routed to and from data networks via a WLAN network without traversing the 5G System (i.e. the WTRU detects that can use non-seamless WLAN offloading). This process is illustrated in FIG. 7.

In step 701, the WTRU is Registered to the 5G System and Non-seamless WLAN offloading is not available.

In step 702, the WTRU establishes multiple PDU Sessions. At least one PDU Session is used to route data to/from an Edge Data Network In step 703, Non-seamless WLAN offloading becomes possible for the WTRU; i.e., the WTRU is in wireless coverage range of a WLAN, and has access to it.

In step 704, the WTRU identifies which traffic flows are routed towards an edge network. This is not possible in the current 5G System design. Note that the order of steps 3 and 4 are interchangeable.

In step 705*a*, the WTRU releases some PDU Session(s) and uses non-seamless offloading for the traffic that was being routed via the released PDU Session(s).

In step 705*b*, the WTRU determines how to handle edge routed traffic (i.e., keep the traffic in the 5G System, terminate it, or attempt to gracefully move it). This is not possible in the current 5G System design.

Several embodiments that relate to how the WTRU may determine what traffic is being routed to an edge data network are described below. The embodiments are complementary and which embodiment(s) are used by the WTRU may depend on which Connectivity Models are used by the WTRU to access edge data networks. For example, according to an embodiment, the WTRU may receive an indication from the SMF that a PDU Session is being used to access an edge data network when the connectivity model of the PDU Session is "session breakout" (i.e., in situations where the SMF independently decided to route some traffic to the edge). According to another embodiment, the WTRU may use URSP rules to determine that a PDU Session is being used to access an edge data network when the connectivity model of the PDU Session is "distributed anchor point" or "multiple PDU sessions" (i.e. in situations where the WTRU established a PDU that specifically goes to an edge DNN or uses SCC Mode 2 or 3 so that the PSA UPF will always be located close the WTRU). Both embodiments may exist simultaneously.

Detecting Edge Traffic

Embodiments are described of methods implemented by a WTRU to associate an Edge-Services-Indication with a PDU Session or Traffic that is associated with a Traffic Descriptor.

When the Edge-Services-Indication is associated with a PDU Session and/or traffic that matches a traffic descriptor, the WTRU may use this indication as a hint that the associated PDU Session may be used to access services that are only available in an edge data network and that abruptly switching the associated application traffic to a different PDU session or terminating the PDU session may impact any user experience that is associated with the application traffic.

Several embodiments are described here of how the WTRU may receive an Edge-Services-Indication from the network. It may be that not all WTRUs are capable of receiving or understanding an Edge-Services-Indication. Thus, before receiving an Edge-Services-Indication, the WTRU may indicate to the network that it supports receiving an Edge-Services-Indication in a Registration Request or an PDU Session Establishment request. Alternatively, when the WTRU decides to use a PDU Session for data that may be routed to the edge, the WTRU may request the Edge-Services-Indication in a PDU Session Establishment Request or a PDU Session Modification Request. For example, the WTRU may indicate to the SMF that the WTRU desires an Edge-Services-Indication if the PDU Session is being used to route data to an edge data network.

The WTRU may use this Edge-Services-Indication to help determine how to handle existing PDU Sessions when URSP Rules are re-evaluated. For example, URSP rules may be re-evaluated when the WTRU connects to a WLAN network. Embodiments below relate to how the Edge-Services-Indication may be used by the WTRU to influence how PDU Sessions are handled when the WTRU connects to an WLAN network.

Embodiments Related to RSD Based Indication

According to an embodiment, a WTRU may receive an Edge-Services-Indication as part of an RSD.

The WTRU receives one or more URSP Rule(s) and each URSP Rule includes a traffic descriptor and one or more RSDs. According to an embodiment, the format of the RSD may be enhanced so that the WTRU may receive one or more RSDs that includes an Edge-Services-Indication.

According to an embodiment, when the WTRU evaluates an RSD or a URSP Rule that includes an Edge-Services-Indication and determines to use the information from RSD to establish a new PDU Session, the WTRU may associate the PDU Session with an Edge-Services-Indication.

According to an embodiment, when the WTRU evaluates an RSD of a URSP rule that includes an Edge-Services-Indication and determines that the information in the RSD matches an existing PDU Session and determines to use the existing PDU Session to send traffic that matches the Traffic of the URSP rule, the WTRU may associate the existing PDU Session with an Edge-Services-Indication.

According to an embodiment, when the WTRU evaluates a URSP rule and determines to use a new, or existing PDU Session that matches an RSD that includes an Edge-Services-Indication, the WTRU may associate the Traffic Descriptor of the URSP Rule with an Edge-Services-Indication. In other words, the WTRU may determine to associate any traffic that matches the Traffic Descriptor and any PDU Session that carries the traffic with Edge-Services-Indication.

Embodiments Related to Traffic Descriptor Based Indication

According to an embodiment, a WTRU may receive an Edge-Services-Indication as part of a Traffic Descriptor.

The WTRU receives one or more URSP Rule(s) and each URSP Rule includes a traffic descriptor and one or more RSDs. According to an embodiment, the format of the Traffic Descriptor may be enhanced so that the WTRU may receive a Traffic Descriptor that includes an Edge-Services-Indication. Alternatively, according to an embodiment, if the Edge-Services-Indication applies to all traffic that matches a Traffic Descriptor, then the Edge-Services-Indication may be included in all the RSDs of the URSP Rule that is associated with the Traffic Descriptor. An embodiment of how the Edge-Services-Indication may be included in an RSD is described above.

According to an embodiment, when the WTRU determines that traffic matches the Traffic Descriptor of a URSP Rule, the Traffic Descriptor is associated with an Edge-Services-Indication, and the WTRU determines to use the information from an RSD of the URSP Rule to establish a new PDU Session, the WTRU may associate the PDU Session with an Edge-Services-Indication.

According to an embodiment, when the WTRU determines that traffic matches the Traffic Descriptor of a URSP Rule, the Traffic Descriptor is associated with an Edge-Services-Indication, the WTRU determines that the information in the an RSD of the URSP Rule matches an existing PDU Session, and determines to use the existing PDU Session to send traffic that matches the Traffic of the URSP rule, the WTRU may associate the PDU Session with an Edge-Services-Indication.

Figure 8:
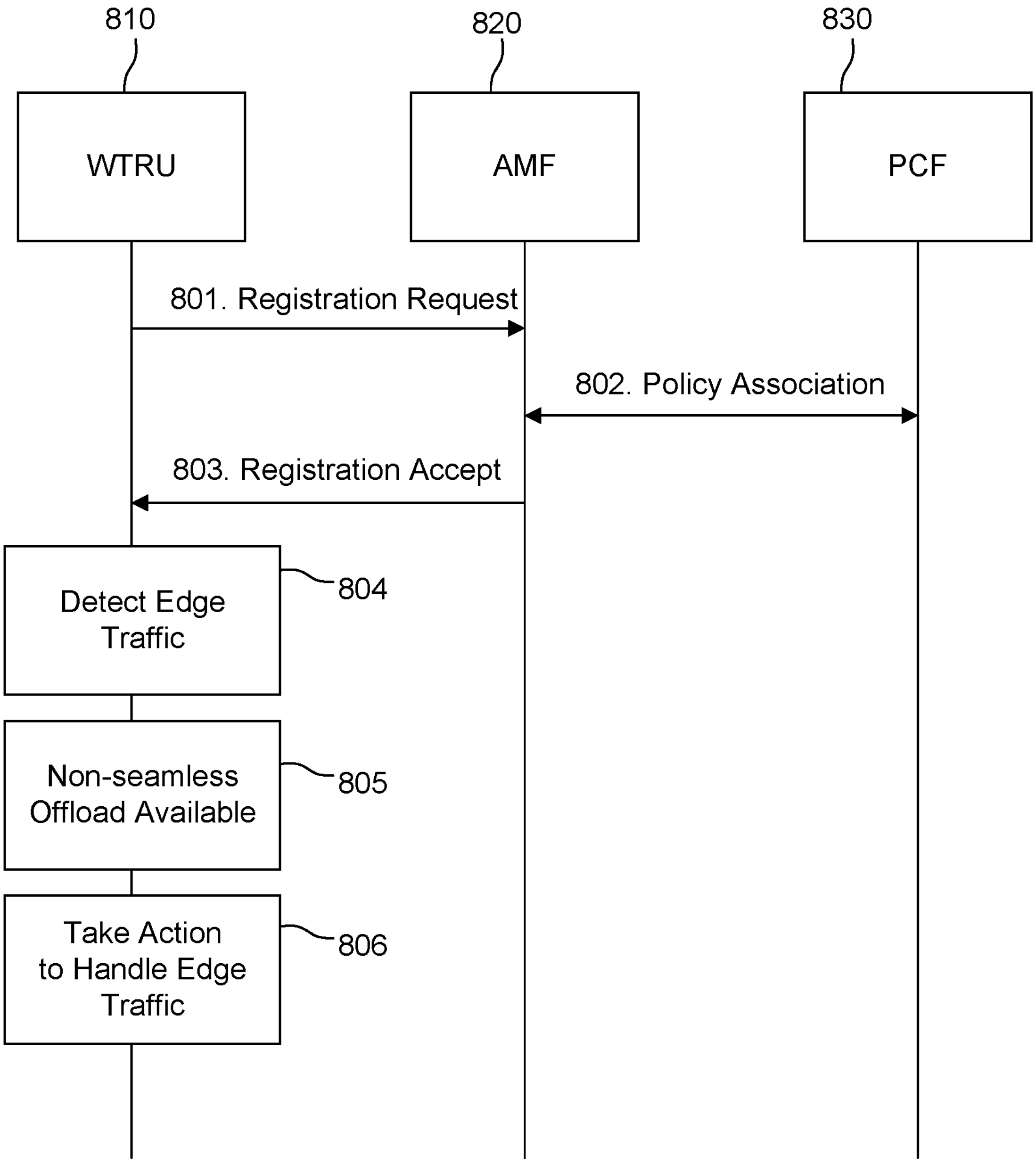
FIG. 8 shows edge services indication in URSP rules.

FIG. 8 shows, in sequence chart form, an example flow of an embodiment of how a WTRU (810) may receive an Edge-Services-Indication in a URSP rule and use the Edge-Services-Indication to determine how to handle edge traffic when non-seamless offloading becomes available.

In 801, the WTRU sends a Registration Request to the network. As described above, the Registration Request may include an indication that the WTRU is capable of receiving or understanding an Edge-Services-Indication.

In 802, the AMF (820) obtains the WTRU's URSP rules from the PCF (830).

In 803, the WTRU receives URSP rules from the network. As described above, the Registration Accept may include URSP Rules that include Edge-Services-Indications.

In 804, the WTRU uses the Edge-Services-Indication in the URSP Rules to detect which traffic is being routed to an edge data network.

In 805, the WTRU determines that non-seamless offloading is available.

In 806, the WTRU takes action to handle the edge routed traffic (i.e., determine to terminate the application traffic, attempt to move the traffic to non-seamless offloading, or keep the traffic in the 5G System).

Embodiments Related to Indication from the SMF to the WTRU

As described earlier, the SMF may insert a Branching Point UPF or an UL CL UPF in a PDU Session. The reason that the SMF adds a Branching Point UPF or an UL CL UPF may be so that certain traffic from the PDU Session is forwarded to an edge data network.

According to an embodiment, when a Branching Point UPF or an UL CL UPF is added to a PDU Session, the network may send an indication to the WTRU that the PDU Session is being used to access edge services. According to an embodiment, this notification may be called an Edge-Services-Indication. According to an embodiment, when the WTRU receives the Edge-Services-Indication, the WTRU may associate the notification with the PDU Session. According to an embodiment, the notification may include the PDU Session ID of the PDU Session that the notification is associated with. According to an embodiment, the Edge-Services-Indication may be sent to the WTRU by the SMF in a NAS-SM message when the SMF inserts a Branching Point UPF or an UL CL UPF. Furthermore, according to an embodiment, when a Branching Point UPF or an UL CL UPF is removed, the SMF may send a notification to the WTRU to indicate to the WTRU that the Branching Point UPF or an UL CL UPF has been removed. According to an embodiment, when the WTRU receives a notification that the Branching Point UPF or an UL CL UPF has been removed, the WTRU may disassociate the Edge-Services-Indication and PDU Session. According to an embodiment, the notification that the Branching Point UPF or UL CL UPF has been removed may include the associated PDU Session ID.

According to an embodiment, the SMF may be configured to not send the notification to the WTRU every time that the SMF adds a Branching Point UPF or an UL CL UPF to the PDU Session. Rather, according to an embodiment, the SMF may be configured to only send the notification when the Branching Point UPF or an UL CL UPF is configured to route traffic to and from an edge data network. According to an embodiment, the SMF may be configured with information that is used to determine which IP Addresses in a Data Network are associated with an edge data network. Thus, according to embodiments, the notification from the SMF will serve as a warning, or an indication, to the WTRU that the PDU Session is being used to access edge services and this warning will be considered by the WTRU when determining whether to use non-seamless WLAN offloading for any traffic that is associated with the PDU Session.

Example embodiments of information elements that may be carried in the notification are listed in the following table:

| Information Element | Meaning |
|---|---|
| PDU Session ID | The PDU Session ID is the identity of the PDU that the notification is associated with. |
| IP 4 Tuple/Flow ID | The IP 4 Tuple/Flow ID describes the traffic from the PDU Session that is being routed towards the edge network or the traffic that triggered the SMF begin sending traffic from the PDU Session to an edge data network. |

Figure 9:
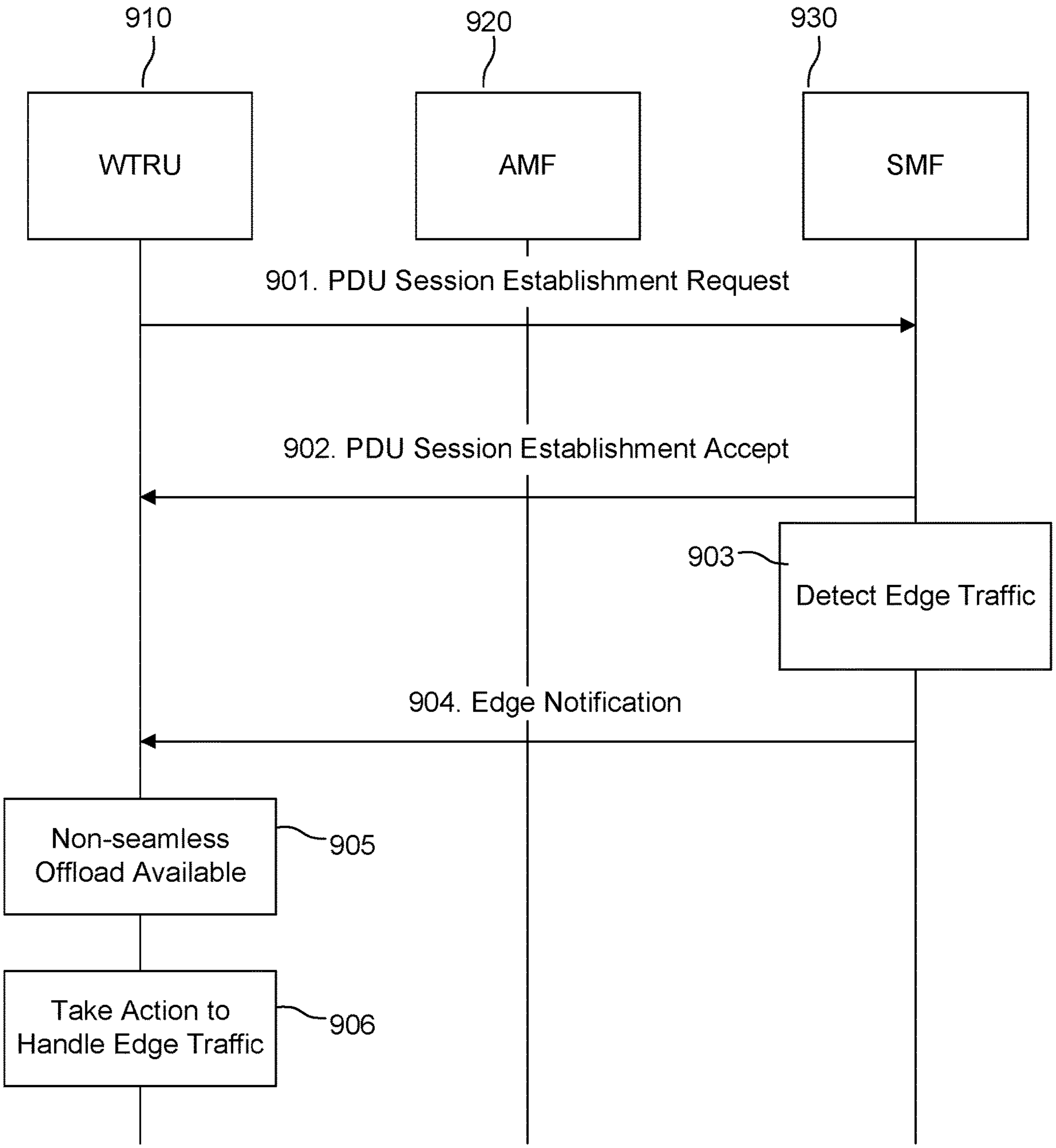
FIG. 9 shows edge services indication in NAS notification.

FIG. 9 shows, in sequence chart form, an example flow where the SMF detects that traffic in the PDU Session is being routed to the edge and sends, according to an embodiment, an NAS-SM notification to the WTRU to indicate to the WTRU that some traffic from the PDU Session is being routed to the edge. Entities shown are, from left to right, WTRU (910), AMF (920) and SMF (930).

In step 901, the WTRU sends a PDU Session Establishment Request to the network (i.e., SMF). As described above, the PDU Session Establishment Request may include, according to an embodiment, an indication that the WTRU is capable of receiving or understanding an Edge-Services-Indication.

In step 902, the SMF sends a PDU Session Establishment Accept message (session establishment accept message) to the WTRU. According to an embodiment, the message may indicate to the WTRU that the SMF will send an Edge-Services-Indication to the WTRU if the SMF detects that some traffic from the PDU Session is being routed to the edge.

In step 903, according to an embodiment, the SMF determines that some traffic from the PDU Session is being routed to the edge. For example, the SMF may make this determination when adding a branching point or uplink classifier to the PDU session.

In step 904, according to an embodiment, as described above, the SMF sends a NAS-SM notification to the WTRU with an Edge-Services-Indication.

In step 905, according to an embodiment, the WTRU determines that non-seamless offloading is available.

In step 906, according to an embodiment, the WTRU takes action to handle the edge routed traffic (i.e. determine to terminate the application traffic, attempt to move the traffic to non-seamless offloading, or keep the traffic in the 5G System).

Embodiments Related to Per PDU Session Indication

According to an embodiment, the SMF may be configured with information that the SMF may use to determine whether a PDU Session may be used to access an edge data network. For example, according to an embodiment, the SMF may be configured to know that PDU Sessions that are associated with certain S-NSSAI/DNN combinations may be used to access an edge data network. According to an embodiment, the configuration information may further indicate that the PDU Session may only be used to access an edge data network if the PDU Session is established by a particular WTRUs.

According to an embodiment, when the WTRU sends a PDU Session establishment request, the SMF may check if the information in the PDU Session establishment request is associated with an edge data network. According to an embodiment, the information in the PDU Session Establishment request may include S-NSSAI and DNN. According to an embodiment, if the information in the PDU Session Establishment request is associated with an edge data network, the SMF may include an Edge-Services-Indication in the PDU Session Establishment Accept message. The inclusion of this notification from the SMF will serve as a warning, or an indication, to the WTRU that the PDU Session may be used to access edge services and this warning will be considered by the WTRU when determining whether to use non-seamless WLAN offloading for any traffic that is associated with the PDU Session.

When the WTRU moves from one Registration Area to another, when the SMF that is associated with the PDU Session changes, or when a UPF that is associated with a PDU Session changes, the ability of a PDU Session to access an edge data network may change. For example, edge services may become available or may no longer be available. When the ability to access an edge data network is added or removed, the SMF may send a PDU Session Modification message (session modification message) to the WTRU.

According to an embodiment, the PDU Session Modification message may indicate to the WTRU whether the Edge-Services-Indication should or should not be associated with the PDU Session and the WTRU may accordingly update any context that is stored for the PDU Session (i.e., remove the Edge-Services-Indication).

Embodiments Related to Per DNN Indication

As described earlier, LADN information is a mechanism that the network may use to send information to the WTRU about a data network. According to an embodiment, the LADN mechanism may be enhanced so that an Edge-Services-Indication may be included in the LADN Information and associated with a DNN. Furthermore, according to an embodiment, if the network needs to provide the indication to WTRU for a data network that is not geographically limited, the network may indicate to the WTRU that the DNN is available in the entire registration area. According to an embodiment, the network may indicate to the WTRU that the DNN is available in the entire registration area by providing no service area information, thus indicating that there is no service area limitation, or by providing a wild card indication in the service area information element.

Alternatively, according to an embodiment, a new information element may be defined that allows the network (i.e., AMF) to provide the WTRU with a DNN and an associated Edge-Services-Indication. According to an embodiment, the AMF may know to provide this information to the WTRU when the WTRU provides a Request-for-Edge-Services-Indication in a Registration Request Message.

Embodiments Related to EDN Configuration and EAS Profile Based Indication

The WTRU may host an Edge Enabler Client (EEC). The EEC may receive service provisioning information from an Edge Configuration Server (ECS). The Service provisioning information includes information that is required by the WTRU to access edge services. The procedure allows the ECS to take the WTRU's location, service requirements, service preferences and connectivity information into account when determining what service information to provide to the EEC.

For each EDN that the WTRU may access, the ECS may provide the EEC with EDN connection information and a list of Edge Enabled Servers (EESs) that are available in the EDN.

The EDN Configuration information may include a DNN, S-NSSAI, and Service Areas for the EDN. The service area may be a set of Cell IDs, PLMN IDs, or Tracking Area Identifiers where the EDN is available.

When the EEC determines to communicate with an EES that was selected from the provisioning information, the EEC may use the information from the EDN Configuration information (i.e., DNN, S-NSSAI) to establish a PDU Session to the EDN. For example, the EEC that is hosted in the TE part for the WTRU may invoke an AT command to request that the MT part of the WTRU establish a PDU Session to the DNN/S-NSSAI combination that can be used to reach the EES. The EEC may provide the DNN/S-NSSAI information to the MT part of the WTRU. Furthermore, according to an embodiment, the provisioning information may be enhanced to include an Edge-Services-Indication. According to an embodiment, when the EEC requests that a PDU Session be used to send data to an EES, the Edge-Services-Indication may be provided to the MT part of the WTRU as part of a Traffic Descriptor using the procedures that are described above. According to an embodiment, the Edge-Services-Indication may be provided to the WTRU for some edge services (EESs) and not to other edge services (other EESs). The reason that this indication may be associated with some EESs and not with other EESs is that some EESs may be reachable when non-seamless WLAN offload is used and other EESs may be reachable even when non-seamless WLAN offload. According to an embodiment, the Edge-Services-Indication may be provided for EESs that are not reachable when non-seamless WLAN offload is used. Thus, the indication serves as a warning to the EEC and to the WTRU that the traffic that is associated with the PDU Session should be kept in the 5G System and not offloaded.

An EEC that is hosted on a WTRU may perform an EAS Discovery procedure with an EES. The EES may provide the EEC with EAS Profile(s) of EAS(s) that Application Clients on the WTRU may access. The EAS profile may include EAS Endpoint information. EAS Endpoint information may be an FQDN or an IP Address of the EAS. Furthermore, according to an embodiment, the EAS profile may be enhanced to include an Edge-Services-Indication. According to an embodiment, an Application Client may obtain this profile information from the EEC and, when the Application Client requests that a PDU Session be used to send data to an EAS, the Edge-Services-Indication may be provided, according to an embodiment, to the MT part of the WTRU as part of a Traffic Descriptor using the procedure that is described above.

Embodiments Related to Edge Data Network (EDN) Indication with Information to Non-3GPP Access Network (AN) Selection The embodiments described above for providing an Edge-Services-Indication to the WTRU may be enhanced according to further embodiments so that Edge-Services-Indication additionally includes ePDG identifier configuration, N3IWF identifier configuration, and Non-3GPP access node selection information. The identified N3IWF or PDG may be used to establish a connection with the 5G System and establish a new PDU Session towards the edge data network.

Accounting for Edge Traffic when Switching to WLAN

As described above and according to an embodiment, the network may provide the WTRU with an Edge-Services-Indication and the WTRU may associate the Edge-Services-Indication with a PDU Session or certain traffic (i.e. traffic to/from particular applications or traffic that matches a particular Traffic Descriptor).

A WTRU that has PDU Sessions with a 5G network may determine that it is able to access a WLAN access network and that the WLAN network may provide access to data networks without utilizing a 5G system (i.e. non-seamless WLAN offloading). For example, the WTRU may make this determination when it receives a particular SSID.

When the WTRU detects a WLAN network that that offers non-seamless WLAN offloading, it may determine to stop using all the PDU Sessions that the WTRU has established with the 5G System and instead use the WLAN network to send and receive all application traffic. As described earlier, if any of the PDU Sessions were being used to access edge data network services, then an abrupt switch to non-seamless WLAN offloading may interrupt application layer service and negatively impact user experience.

Alternatively, according to an embodiment, when the WTRU detects a WLAN network that that offers non-seamless WLAN offloading, the WTRU may trigger any combination of the following actions according to embodiments described hereunder.

First, according to an embodiment, the WTRU may send a notification to any application(s) that are associated with an Edge-Services-Indication that the WTRU will begin non-seamless WLAN offloading. According to an embodiment, the notification may be sent to an EEC that is hosted in the WTRU and the EEC may use the EDGE-5 reference point to send information from the notification to an Application Client that is hosted in the WTRU and accesses edge services. According to an embodiment, the notification may include a timer value. According to an embodiment, the notification may trigger the application(s) to take action to disconnect their application layer session with any services in the edge data network. According to an embodiment, the timer value may be interpreted by the application as the amount of time the application has to disconnect the application layer session before the PDU Session is released.

When it is time to release the PDU Session, the WTRU will send a PDU Session Release message. Alternatively, according to an embodiment, the PDU Session Modification message may be used by the WTRU to provide the time value to the network and the network may initiate release of the PDU Session when the timer expires. The network-based approach to releasing the PDU Session may be useful if the WTRU is expected to lose cellular coverage before the timer expires. According to an embodiment, the notification to application layer may be sent from the MT part of the WTRU to the Application in the TE part of the WTRU via an AT Command. According to an embodiment, the time value that is provided to the application may be based on a time value that was received from the network.

According to an embodiment, the WTRU may determine that it is time to release the PDU Session when it receives an indication that the traffic has been moved, or terminated. According to an embodiment, the indication that the traffic has been moved, or terminated, may be received from an Application such as the EEC. According to an embodiment, the indication may be received by the MT part of the WTRU from the EEC via an AT Command. According to an embodiment, the EEC may determine to send the indication when an Application Cline that is hosted in the WTRU uses the EDGE-5 interface to inform the EEC that the connection can be released.

Second, the WTRU may send a PDU Session Release Request (session release request) to the network for any PDU Session that is not associated with an Edge-Services-Indication. The WTRU may then use the non-seamless WLAN offloading for any traffic that was associated with a PDU Session that is not associated with an Edge-Services-Indication.

Third, according to an embodiment, the WTRU may start a timer for each PDU Session that is associated with an Edge-Services-Indication. According to an embodiment, when the timer expires the WTRU may send a PDU Session Release Request to the network for the PDU Session that is associated with the timer. According to an embodiment, the WTRU may then use non-seamless WLAN offloading for any traffic that was associated with a PDU Session that was associated with an Edge-Services-Indication. According to an embodiment, while the timer is running, the Applications that are using the PDU Session may begin to execute procedures to terminate their application layer session with services in the edge data network. According to an embodiment, the amount of time that the timer runs may be based on a time value that was received from the network. Alternatively, according to an embodiment, the WTRU may choose to not use non-seamless WLAN offloading for any traffic that is using a PDU Session that is associated with an Edge-Services-Indication.

Fourth, a GUI on the WTRU may, according to an embodiment, display a message to the user indicating that access to edge data network will soon be terminated. According to an embodiment, the GUI message may indicate that the reason for the loss of connectivity to the edge data network is that the WTRU's cellular connection is being released in favor of non-seamless WLAN offloading, the message may, according to an embodiment, indicate the name of the edge data network(s) (i.e. DNN's) that the WTRU will no longer be able to access, and the message may, according to an embodiment, indicate an amount of time that will pass before connectivity to the edge data network will be lost. According to an embodiment, the amount of time that is indicated may be based on a time value that was received from the network. According to an embodiment, the GUI may also present the user with the ability to select how application traffic should be handled when the application traffic is being routed towards an edge network and non-seamless offloading becomes available for the WTRU. According to an embodiment, the user may indicate that the user prefers to terminate the application traffic, attempt to move the traffic to non-seamless offloading, or to keep the traffic in the 5G System.

Fifth, according to an embodiment, if the Edge-Services-Indication includes ePDG identifier configuration, N3IWF identifier configuration, and Non-3GPP access node selection information, the WTRU may attempt to use non-seamless WLAN offloading to establish a connection with an N3IWF or ePDG (e.g. an NWu connection with the N3IWF) and establish a new PDU Session with the Edge Data Network before terminating the PDU Session that is established via the 3GPP access network.

Sixth, according to an embodiment, URSP Rule re-evaluation may be triggered. During URSP re-evaluation, if the Edge-Services-Indication is in an RSD or Traffic Descriptor, the WTRU may, according to an embodiment, interpret the indication as a signal that the Traffic may not be routed via non-seamless offloading. Thus, the WTRU may know which traffic should stay in the 5G system and what routes (i.e. PDU Session) should be maintained even when non-seamless offloading becomes available.

Figure 10:
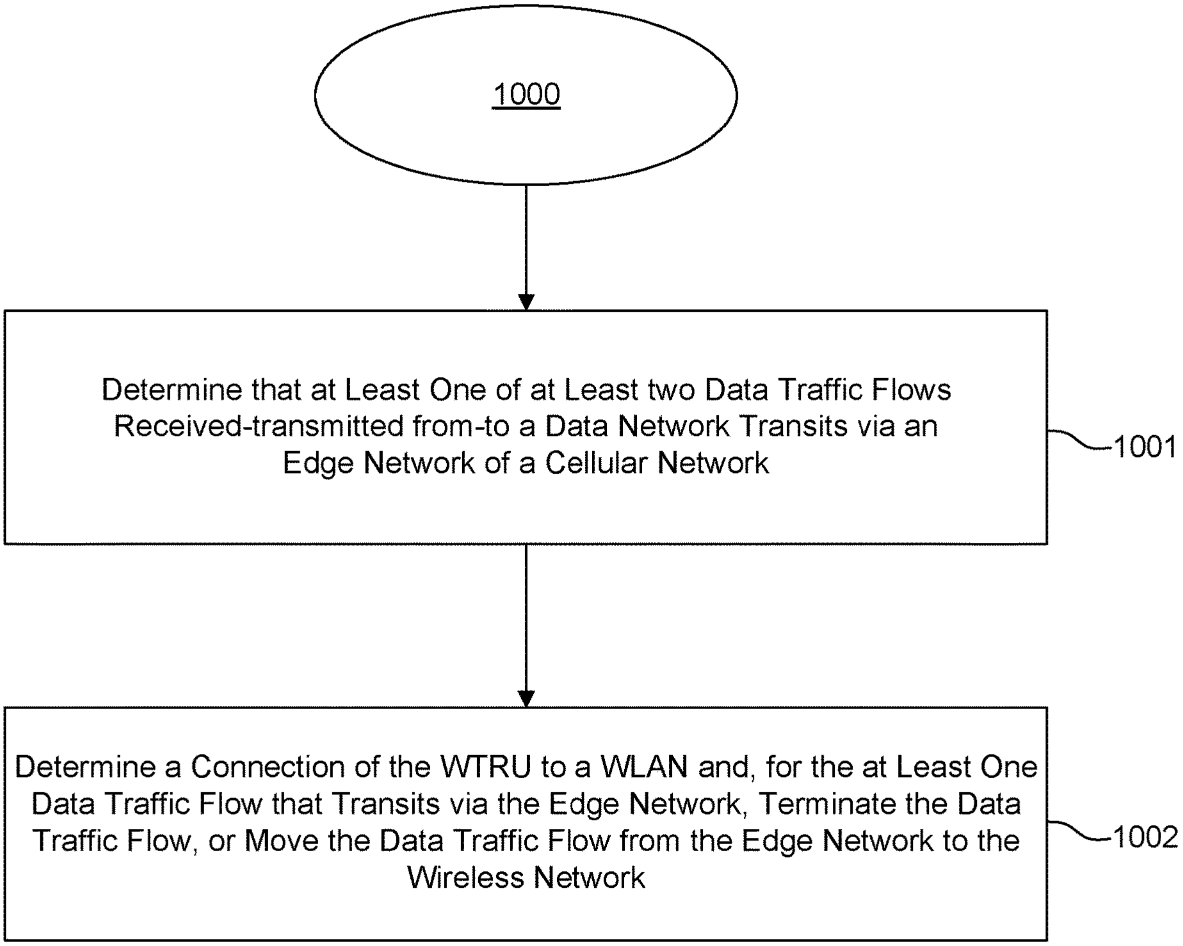
FIG. 10 is a flow chart of a method according to an embodiment.

FIG. 10 is a flow chart of a method 1000 according to an embodiment. The method may be implemented by a WTRU. In 1001, the WTRU determines, from at least two data traffic flows received-transmitted by the WTRU from-to a data network, that at least one data traffic flow received-transmitted by the WTRU, transits via an edge network of a cellular network. In 1002, the WTRU determines a connection of the WTRU to a wireless local area network, and, for at the least one data traffic flow that transits via the edge network, terminates the at least one data traffic flow, or moves the at least one data traffic flow from the edge network to the wireless local area network.

According to a further embodiment, the WTRU determines that at least one data traffic flow that transits via the edge network from information comprised in one of: a route selection descriptor received in a route selection policy rule, a traffic descriptor received in a route selection policy rule, a received session establishment accept message, a received session modification message.

According to a further embodiment, the method comprises, for moving the at least one data traffic flow from the edge network to the wireless local area network: transmitting information representative of a notification, to an application associated with the at least one data traffic flow that transits via the edge network, that the WTRU starts moving the at least one data traffic flow that transits via the edge network from the edge network to the wireless local area network.

According to a further embodiment, the information representative of the notification that the WTRU starts moving the at least one data traffic flow that transits via the edge network from the edge network to the wireless local area network is transmitted to an edge enabler client in the WTRU, the edge enabler client being configured to provide services to applications hosted on the WTRU and being configured to access services in the edge network.

According to a further embodiment, the method comprises, for at least one data traffic flow received-transmitted by the WTRU that does not transit via the edge network, transmitting, by the WTRU, a session release request.

According to a further embodiment, the WTRU starts a timer when transmitting the information representative of a notification, to an application associated with the at least one data traffic flow that transits via the edge network, that the WTRU starts moving the at least one data traffic flow that transits via the edge network from the edge network to the wireless local area network. When the timer expires, the WTRU transmits a session release message for the at least one data traffic flow that transits via the edge network.

According to a further embodiment, the timer is set with a value received from the data network.

The present disclosure also relates to a wireless transmit-receive unit (WTRU) comprising at least one processor, the at least one processor being configured to execute the steps of the method 1000 and of any of the above described further embodiments.

Figure 11:
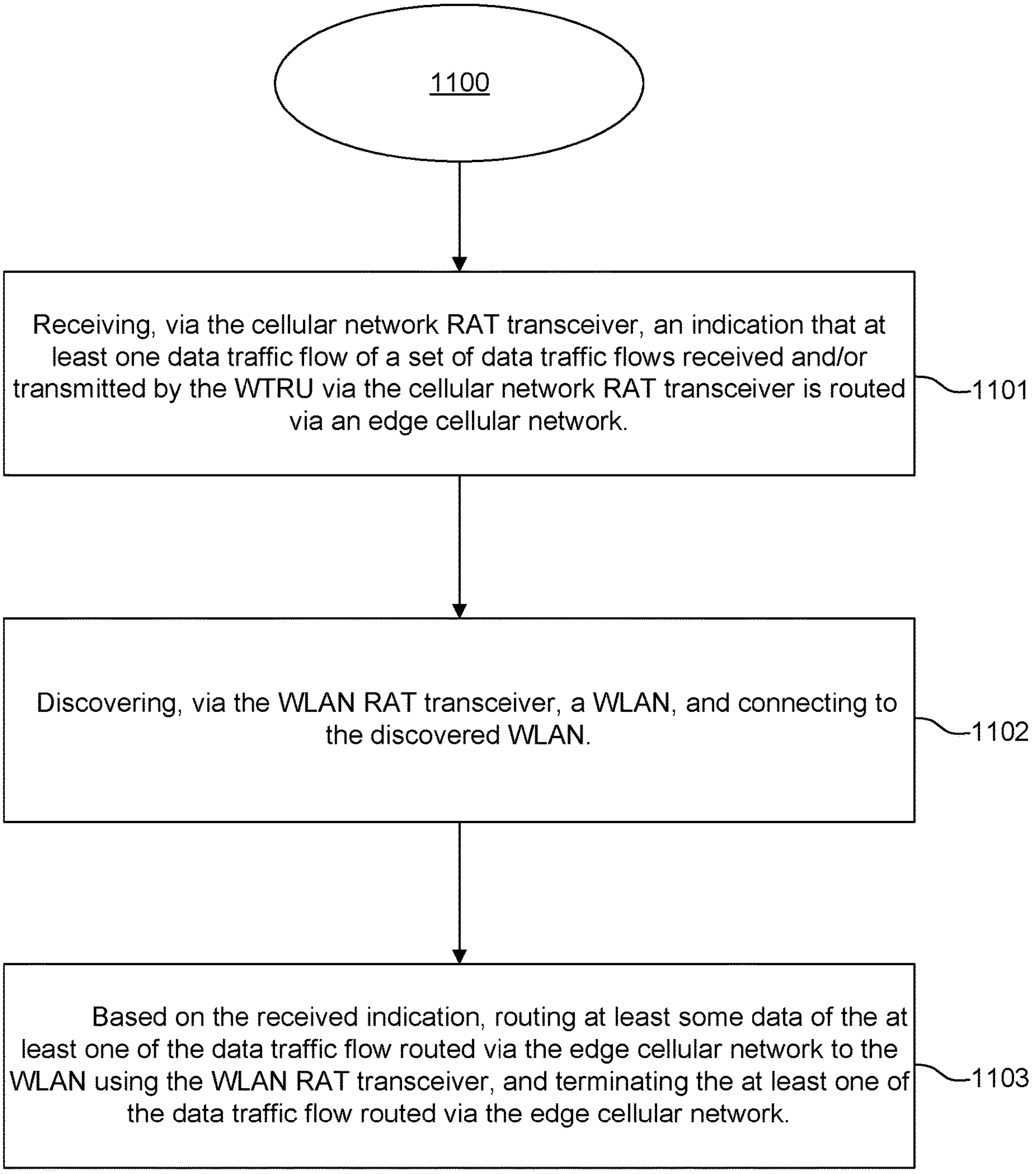
FIG. 11 is a flow chart of a method according to an embodiment.

FIG. 11 is a flow chart of a method 1100, implemented by a WTRU having a wireless local area network (WLAN) radio access technology (RAT) transceiver and a cellular network RAT transceiver. In 1101, the WTRU receives, via the cellular network RAT transceiver, an indication that at least one data traffic flow of a set of data traffic flows received and/or transmitted by the WTRU via the cellular network RAT transceiver is routed via an edge cellular network. In 1102 the WTRU discovers, via the WLAN RAT transceiver, a WLAN, and connects to the discovered WLAN. In 1103, based on the received indication, the WTRU routes at least some data of the at least one data traffic flow routed via the edge cellular network to the WLAN using the WLAN RAT transceiver, and terminates the at least one data traffic flow routed via the edge cellular network.

According to an embodiment of the method, the method comprises transmitting, via the cellular network RAT transceiver, a request for receiving the indication that at least one data traffic flow of a set of data traffic flows received and/or transmitted by the WTRU via the cellular network RAT transceiver is routed via an edge cellular network.

According to an embodiment of the method, the indication indicates that a protocol data unit session is used to access edge services, the indication comprising a protocol data unit session identifier of a protocol data unit session the indication is associated with.

According to an embodiment of the method, the indication is received in a non-access stratum session management message.

According to an embodiment, the request is comprised in one of: a registration request; a protocol data unit session establishment request; a protocol data unit session modification request.

According to an embodiment of the method, the indication is comprised in one of: a route selection descriptor in a route selection policy rule; a traffic descriptor in a route selection policy rule; a received session establishment accept message; a received session modification message.

According to an embodiment of the method, the terminating comprises transmitting a protocol data unit session release request for the protocol data unit session the indication is associated with as identified by the protocol data unit session identifier comprised in the indication.

According to an embodiment, there is also disclosed a wireless transmitter-receiver unit (WTRU) having a wireless local area network (WLAN) radio access technology (RAT) transceiver and a cellular network RAT transceiver. The WTRU comprises at least one processor configured: to receive, via the cellular network RAT transceiver, an indication that at least one data traffic flow of a set of data traffic flows received and/or transmitted by the WTRU via the cellular network RAT transceiver is routed via an edge cellular network; to discover, via the WLAN RAT transceiver, a WLAN, and connect to the discovered WLAN; and, based on the received indication, to route at least some data of the at least one data traffic flow routed via the edge cellular network to the WLAN using the WLAN RAT transceiver, and to terminate the at least one data traffic flow routed via the edge cellular network.

According to an embodiment, the at least one processor is configured to transmit, via the cellular network RAT transceiver, a request for receiving the indication that at least one data traffic flow of a set of data traffic flows received and/or transmitted by the WTRU via the cellular network RAT transceiver is routed via an edge cellular network.

According to an embodiment, the at least one processor is configured to receive the indication via the cellular network RAT transceiver, the indication indicating that a protocol data unit session is used to access edge services, the indication comprising a protocol data unit session identifier of a protocol data unit session the indication is associated with.

According to an embodiment, the at least one processor is configured to receive the indication in a non-access stratum session management message.

According to an embodiment, the at least one processor is configured to comprise the request in one of: a registration request; a protocol data unit session establishment request; a protocol data unit session modification request.

According to an embodiment, the at least one processor is configured to receive the indication in one of: a route selection descriptor in a route selection policy rule; a traffic descriptor in a route selection policy rule; a received session establishment accept message; a received session modification message.

According to an embodiment, the at least one processor is configured to terminate the at least one of the data traffic flow routed via the edge cellular network by transmitting a protocol data unit session release request for the protocol data unit session the indication is associated with as identified by the protocol data unit session identifier comprised in the indication.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.) and/or "permissive" terms (e.g., the term "is" may be interpreted as "may" or "might", the term "refers" may be interpreted as "may refer", etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method implemented by a wireless receive-transmit unit (WTRU) having a wireless local area network (WLAN) radio access technology (RAT) transceiver and a cellular network RAT transceiver, the method comprising:

receiving, via the cellular network RAT transceiver, an indication that at least one first data traffic flow of a set of data traffic flows received and/or transmitted by the WTRU via the cellular network RAT transceiver is routed via an edge cellular network;

determining a connection to a WLAN using the WLAN RAT transceiver, for non-seamless offload of at least one second data traffic flow of the set of data traffic flows via the connection to the WLAN; and based on the indication received via the cellular network RAT transceiver, continue routing the at least one first data traffic flow routed via the edge cellular network using the cellular network RAT transceiver, and routing the at least one second data traffic flow via the connection to the WLAN.

2. The method according to claim 1, wherein the indication identifies the at least one first data traffic flow through a traffic descriptor.

3. The method according to claim 1, wherein the indication is received in a route selection policy.

4. The method according to claim 3, wherein the indication is received in a non-access stratum session management message.

5. The method according to claim 1, comprising transmitting, via the cellular network RAT transceiver, a request for receiving the indication.

6. The method according to claim 5, wherein the request is comprised in one of:

a registration request;

a protocol data unit session establishment request; and a protocol data unit session modification request.

7. The method according to claim 5, wherein the indication is comprised in one of:

a route selection descriptor in a route selection policy rule;

a traffic descriptor in a route selection policy rule;

a received session establishment accept message; and a received session modification message.

8. The method according to claim 1, comprising transmitting an indication of the non-seamless offload of the at least one second data traffic flow of the set of data traffic flows via the connection to the WLAN.

9. A wireless transmitter-receiver unit (WTRU) having a wireless local area network (WLAN) radio access technology (RAT) transceiver and a cellular network RAT transceiver, the WTRU comprising at least one processor configured to:

receive, via the cellular network RAT transceiver, an indication that at least one first data traffic flow of a set of data traffic flows received and/or transmitted by the WTRU via the cellular network RAT transceiver is routed via an edge cellular network;

determine a connection to a WLAN using the WLAN RAT transceiver, for non-seamless offload of at least one second data traffic flow of the set of data traffic flows via the connection to the WLAN; and based on the indication received via the cellular network RAT transceiver, continue to route the at least one first data traffic flow routed via the edge cellular network using the cellular network RAT transceiver, and route the at least one second data traffic flow via the connection to the WLAN.

10. The WTRU according to claim 9, wherein the indication identifies the at least one first data traffic flow through a traffic descriptor.

11. The WTRU according to claim 9, wherein the indication is received in a route selection policy.

12. The WTRU according to claim 11, wherein the at least one processor is configured to receive the indication in a non-access stratum session management message.

13. The WTRU according to claim 9, wherein the at least one processor is configured to transmit, via the cellular network RAT transceiver, a request for receiving the indication.

14. The WTRU according to claim 13, wherein the at least one processor is configured to comprise the request in one of:

a registration request;

a protocol data unit session establishment request; and a protocol data unit session modification request.

15. The WTRU according to claim 13, wherein the at least one processor is configured to receive the indication in one of:

a route selection descriptor in a route selection policy rule;

a traffic descriptor in a route selection policy rule;

a received session establishment accept message; and a received session modification message.

16. The WTRU according to claim 9, wherein the at least one processor is configured to transmit an indication of the non-seamless offload of the at least one second data traffic flow of the set of data traffic flows via the connection to the WLAN.

* * * * *